United States Patent
Nagamachi et al.

(10) Patent No.: US 10,203,014 B2
(45) Date of Patent: Feb. 12, 2019

(54) COVER MEMBER AND SHOCK ABSORBER

(71) Applicants: Showa Corporation, Gyoda (JP); FUKOKU BUSSAN CO., LTD., Tokyo (JP)

(72) Inventors: Tomoyoshi Nagamachi, Gyoda (JP); Shinichi Sutou, Tokyo (JP)

(73) Assignees: SHOWA CORPORATION, Gyoda (JP); FUKOKU BUSSAN CO., LTD., Tokyo (JP)

( * ) Notice: Subject to any disclaimer, the term of this patent is extended or adjusted under 35 U.S.C. 154(b) by 0 days.

(21) Appl. No.: 14/699,498

(22) Filed: Apr. 29, 2015

(65) Prior Publication Data

US 2015/0267770 A1   Sep. 24, 2015

Related U.S. Application Data

(63) Continuation of application No. PCT/JP2014/078049, filed on Oct. 22, 2014.

(30) Foreign Application Priority Data

Mar. 20, 2014   (JP) .................................. 2014-059262

(51) Int. Cl.
   *F16F 9/38* (2006.01)

(52) U.S. Cl.
   CPC ...................................... *F16F 9/38* (2013.01)

(58) Field of Classification Search
   CPC ...... F16J 3/04; F16J 3/041; F16J 3/047; F16F 9/38; F16F 9/19; F16F 2230/105
   See application file for complete search history.

(56) References Cited

U.S. PATENT DOCUMENTS

| | | | | |
|---|---|---|---|---|
| 1,094,323 A | * | 4/1914 | Fulton | F16J 3/047 138/121 |
| 1,661,131 A | * | 2/1928 | Duffield | F16F 9/04 74/18.2 |

(Continued)

FOREIGN PATENT DOCUMENTS

| | | |
|---|---|---|
| CN | 201196243 Y | 2/2009 |
| CN | 102829126 A | 12/2012 |

(Continued)

OTHER PUBLICATIONS

International Search Report dated Dec. 2, 2014 for the corresponding PCT Application No. PCT/JP2014/078049.

(Continued)

*Primary Examiner* — Xuan Lan Nguyen
(74) *Attorney, Agent, or Firm* — Leason Ellis LLP

(57) ABSTRACT

A dust cover is provided in a cylindrical shape in an axial direction of a suspension apparatus configured to dampen a shock, and is extendable and compressible in the axial direction, or can be bent. A dust cover has a plurality of peak sections provided in the axial direction and configured to protrude outward in a radial direction, a plurality of valley sections provided in the axial direction and configured to protrude inward in the radial direction, and a plurality of connection sections provided in the axial direction and configured to connect the peak sections and the valley sections. At least one of axial concave sections and axial convex sections, which are formed in the axial direction, are provided in at least any of the peak section, the valley section, and the connection section.

15 Claims, 24 Drawing Sheets

(56) References Cited

U.S. PATENT DOCUMENTS

| | | | | |
|---|---|---|---|---|
| 2,606,442 | A * | 8/1952 | Raines | E21B 47/00 |
| | | | | 200/83 B |
| 2,876,801 | A * | 3/1959 | November | F16L 11/15 |
| | | | | 138/121 |
| 3,559,692 | A * | 2/1971 | Mantelet | F16L 11/111 |
| | | | | 138/121 |
| 4,079,757 | A * | 3/1978 | Fischer | F16J 3/041 |
| | | | | 138/121 |
| 7,670,535 | B2 * | 3/2010 | Renzo | B29C 45/2618 |
| | | | | 264/328.1 |
| 2012/0319338 | A1 * | 12/2012 | Takada | F16F 9/38 |
| | | | | 267/217 |

FOREIGN PATENT DOCUMENTS

| | | | | |
|---|---|---|---|---|
| CN | 103210233 A | 7/2013 | | |
| DE | 4233319 A | 4/1994 | | |
| JP | 48-041681 Y | 12/1973 | | |
| JP | 59-152285 U | 10/1984 | | |
| JP | 59-180049 U | 12/1984 | | |
| JP | 61127973 A * | 6/1986 | | F16J 3/041 |
| JP | 10-267124 A | 10/1998 | | |
| JP | 2003-004084 A | 1/2003 | | |
| JP | 3122007 U | 5/2006 | | |

OTHER PUBLICATIONS

Office Action dated Jan. 6, 2015 for the corresponding Japanese Application No. 2014-551479 (JP National Phase of PCT/JP2014/078049).

Office Action dated Mar. 29, 2016 for the corresponding Chinese Patent Application No. 201480002554.3.

Office Action dated Oct. 8, 2016 for the corresponding Chinese Patent Application No. 201480002554.3.

* cited by examiner

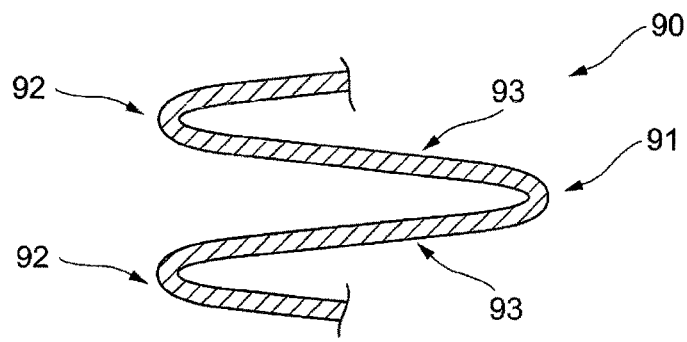
FIG. 6A
Prior Art
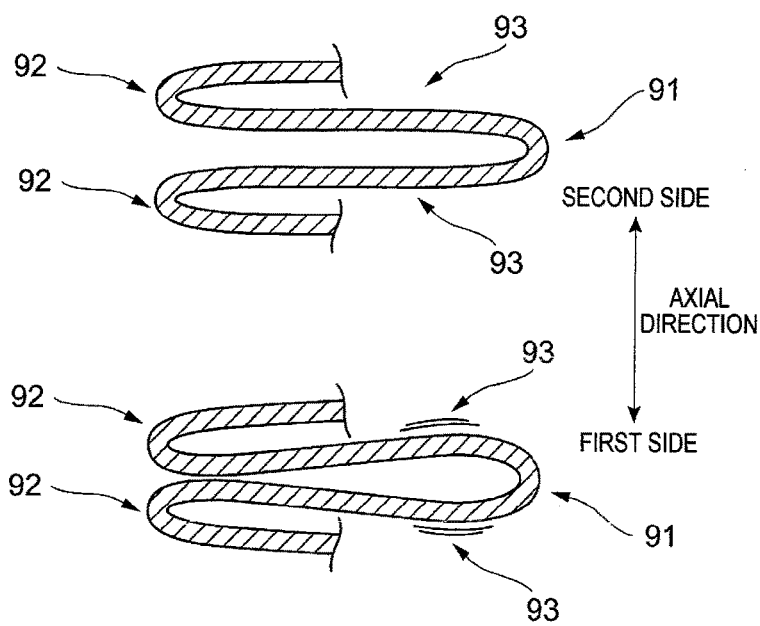
FIG. 6B
Prior Art
FIG. 6C
Prior Art
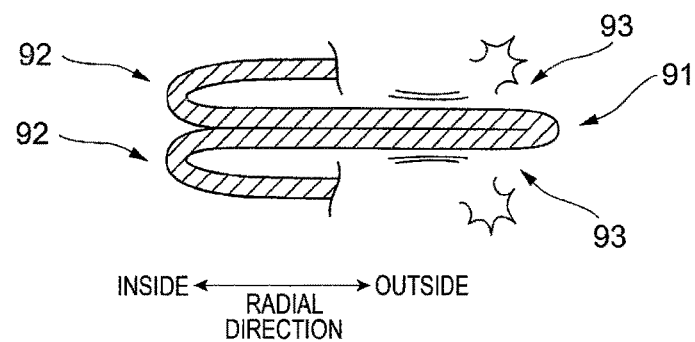
FIG. 6D
Prior Art (a) Prior Art (b)

FIG. 8
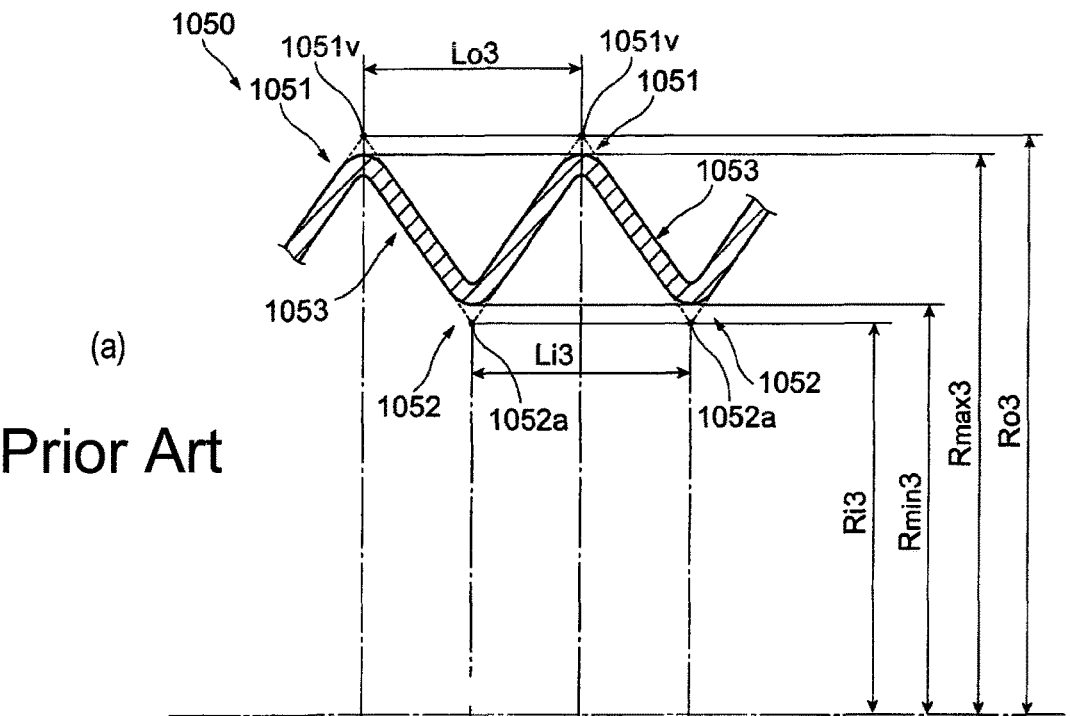
(a) Prior Art
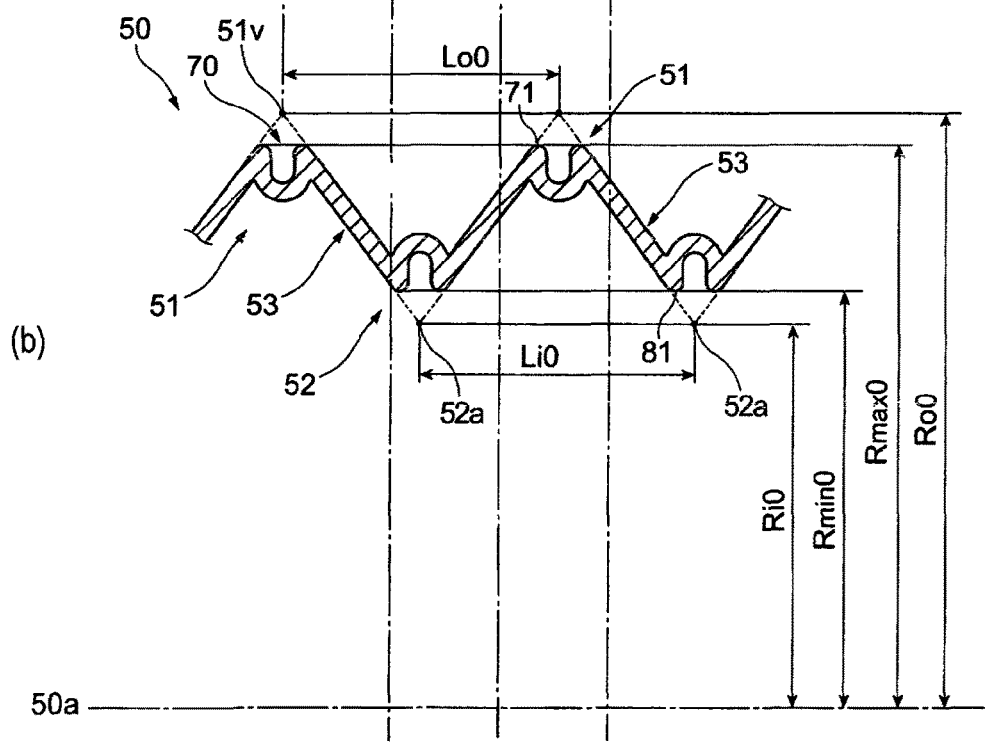
(b)

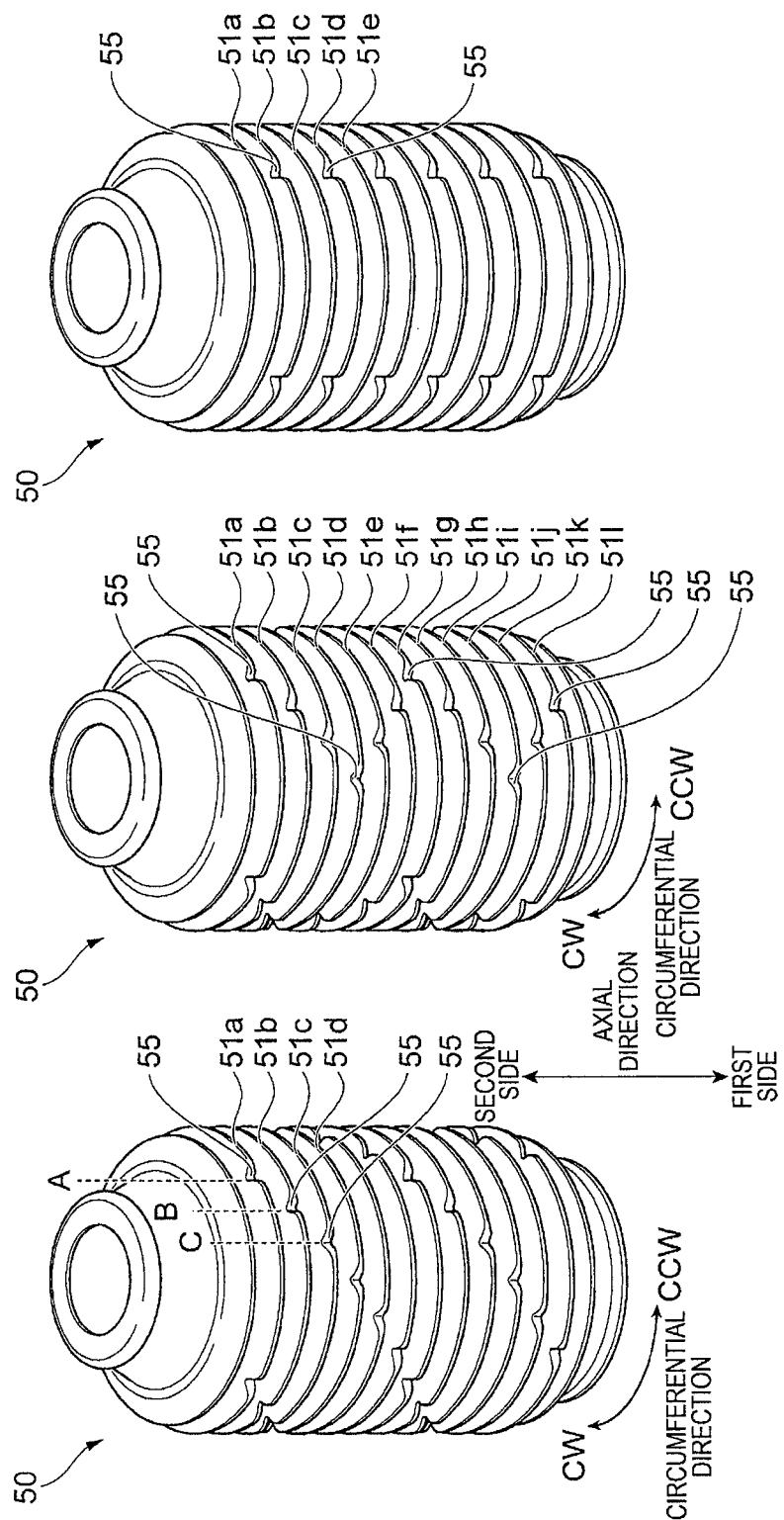

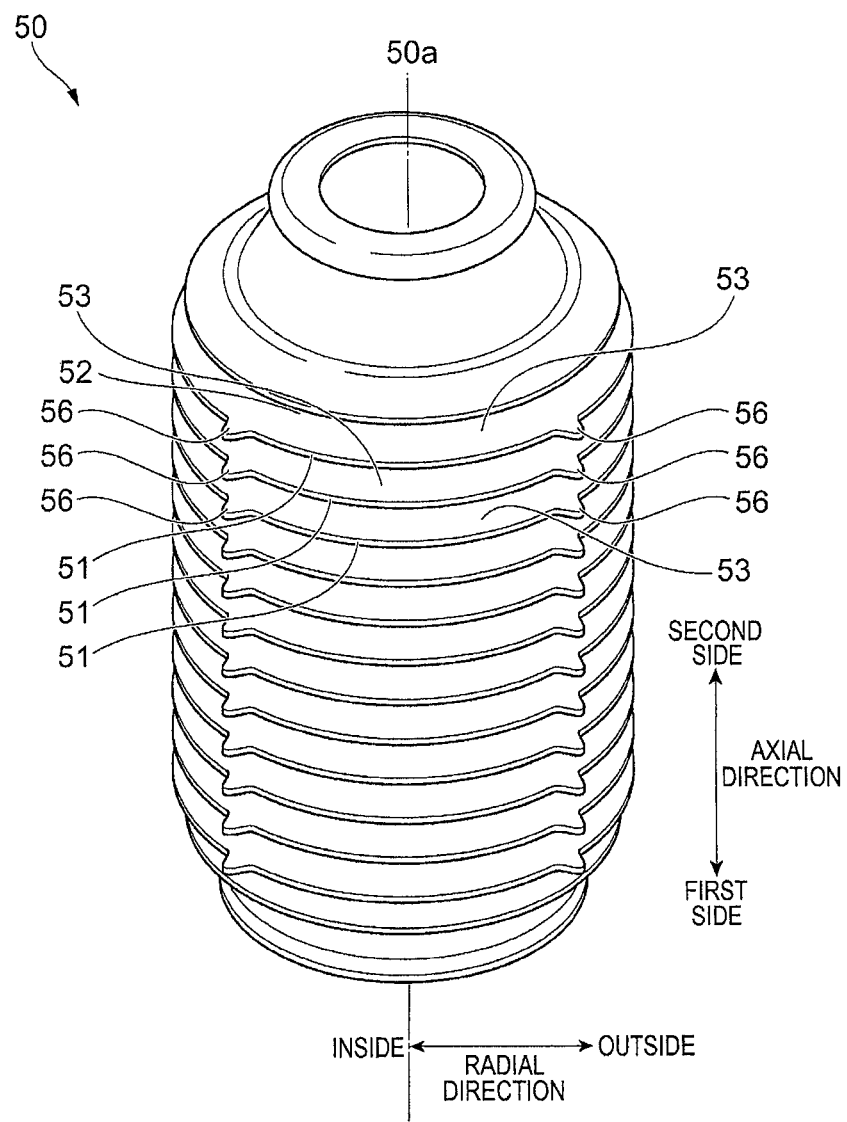

COVER MEMBER AND SHOCK ABSORBER

CROSS REFERENCE TO RELATED APPLICATION

This is a continuation of International Application No. PCT/JP2014/078049 filed on Oct. 22, 2014, and claims priority to Japanese Patent Application No. 2014-059262, filed on Mar. 20, 2014, the entire disclosures of which are incorporated herein by reference.

BACKGROUND

1. Field of the Invention

The present invention relates to a cover member and a shock absorber.

2. Description of Related Art

In the related art, for example, a cover member is used to cover and protect the outer circumference of a piston rod or a cylinder of a hydraulic shock absorber of a suspension apparatus (suspension).

For example, a bellows-like body (cover member) disclosed in JP-A-10-267124 has a cross-sectional shape in which peak sections and valley sections are alternately successively formed except for attachment sections at both ends of the bellows-like body. The bellows-like body (cover member) covers the circumference of the cylinder on the inside of a spring.

The cover member, is axially extended and compressed in association with a movement of the piston rod of the suspension apparatus. At this time, contact between sections of the cover member may cause the occurrence of contact noise, which is a problem.

SUMMARY OF THE INVENTION

An illustrative aspect of the present invention is to prevent contact noise from occurring when a cover member is extended and compressed.

An aspect of the present invention provides a cover member that is formed in a cylindrical shape in an axial direction of a suspension apparatus configured to dampen a shock, and that is extendable and compressible in the axial direction or can be bent, the member including: a plurality of peak sections provided in the axial direction and configured to protrude outward in a radial direction; a plurality of valley sections provided in the axial direction and configured to protrude inward in the radial direction; and a plurality of connection sections provided in the axial direction and configured to connect the peak sections and the valley sections. At least one of an axial concave section and an axial convex section formed in the axial direction is provided in at least any of the peak section, the valley section, and the connection section.

Another aspect of the present invention provides a suspension apparatus including: a cylinder configured to accommodate liquid therein; a piston accommodated in the cylinder and configured to dampen input vibration; a piston rod having the piston on a first tip thereof; and a cover member which is an axially extending cylindrical member, in which a peak section group having a plurality of peak sections configured to protrude outward in a radial direction, a valley section group having a plurality of valley sections configured to protrude inward in the radial direction; and a connection section group having a plurality of connection sections configured to connect the peak sections and the valley sections are disposed in an axial direction. The cover member is extended and compressed in a direction in which the peak sections and the valley sections are disposed side by side, or is bent, and the cover member has at least one of an axial concave section and an axial convex section formed in the axial direction provided in at least any of the peak section group, the valley section group, and the connection section group.

With any one of the aspects discussed above, it is possible to prevent the occurrence of contact noise when the cover member is extended and compressed.

BRIEF DESCRIPTION OF THE DRAWINGS

FIGS. 6A to 6D are schematic views illustrating motions of a dust cover of a reference example when extended and compressed.

FIG. 7 illustrates a comparison between dust covers in which FIG. 7(a) is an enlarged cross-sectional view of a dust cover of a first comparative example, and FIG. 7(b) is an enlarged cross-sectional view of the dust cover of Embodiment 1.

FIG. 8 illustrates a comparison between dust covers in which FIG. 8(a) is an enlarged cross-sectional view of a dust cover of a second comparative example, and FIG. 8(b) is an enlarged cross-sectional view of the dust cover of Embodiment 1.

FIGS. 12A to 12C are views illustrating the dust covers of Modification Example 2.

FIG. 13 is a view illustrating the dust cover of Modification Example 3.

DETAILED DESCRIPTION OF THE INVENTION

Hereinafter, embodiments of the present invention will be described in detail with reference to the accompanying drawings.

Embodiment 1

Figure 1:
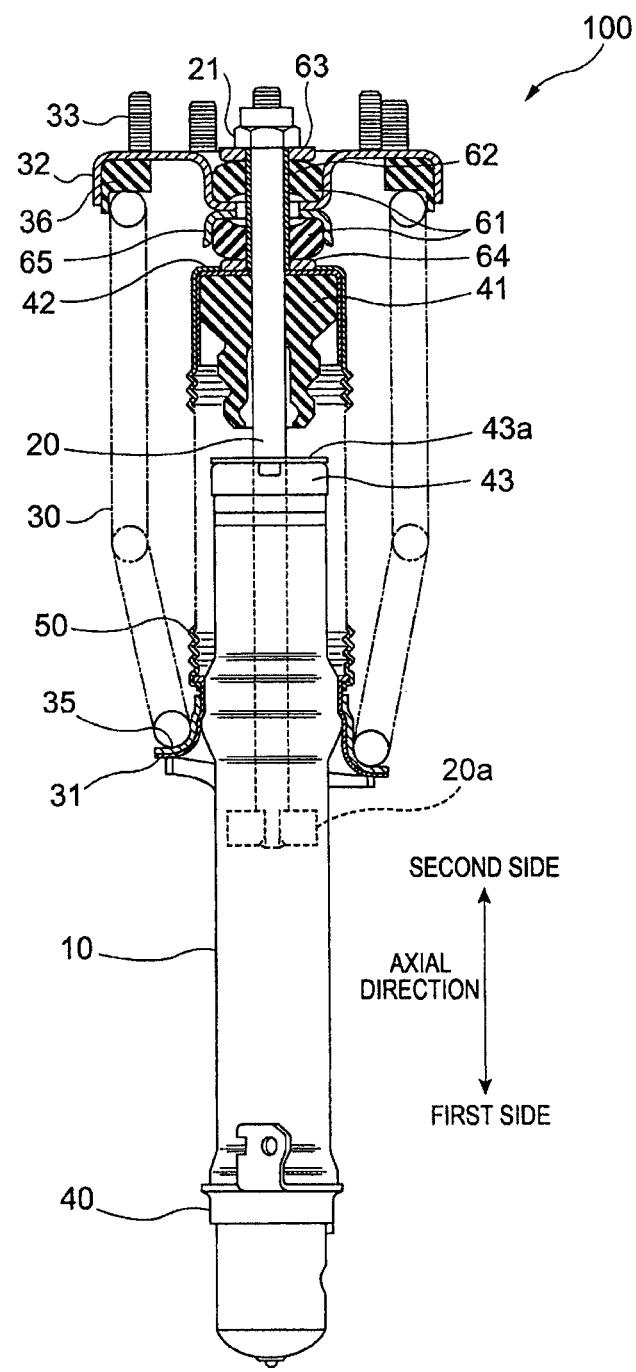
FIG. 1 is a view illustrating a schematic configuration of a suspension apparatus of Embodiment 1.

FIG. 1 is a view illustrating a schematic configuration of a suspension apparatus 100 of Embodiment 1.

As illustrated in FIG. 1, the suspension apparatus 100 includes a cylinder 10 that has a damper device (not illustrated) built thereinto; a piston rod 20 configured to support a piston 20a accommodated in the cylinder 10; and a spring 30 disposed on the outside of the piston rod 20. The piston rod 20 is a member having a cylindrical shape or a columnar shape, and the piston is attached to a first axial end section of the cylindrical member or the columnar member, and a nut 21 is attached to a second axial end section thereof.

Hereinafter, an axial direction of the cylindrical shape or the columnar shape of the piston rod 20 is simply referred to as an "axial direction". An axial lower side refers to a "first side", and an axial upper side refers to a "second side".

The suspension apparatus (shock absorber) 100 of an embodiment has the cylinder 10 configured to accommodate oil (liquid) therein; the piston 20a accommodated in the cylinder 10 and configured to dampen input vibration; the piston rod 20 having the piston 20a on a first side thereof; and a dust cover (cover member) 50 which is an axially long cylindrical member, and in which a peak section group having a plurality of peak sections 51 configured to protrude outward in a radial direction, a valley section group having a plurality of valley sections 52 configured to protrude inward in the radial direction; and a connection section group having a plurality of connection sections 53 configured to connect the peak sections 51 and the valley sections 52 which are disposed in the axial direction. The dust cover 50 is extended and compressed in a direction in which the peak sections 51 and the valley sections 52 are respectively disposed side by side, or is bent, and in the dust cover 50, at least one of axial concave sections 55 and axial convex sections 56 formed in the axial direction is provided in at least any of the peak section group, the valley section group, and the connection section group. In Embodiment 1, the peak section group has the axial concave section 55 formed in the axial direction.

The suspension apparatus 100 includes a lower spring seat 31 attached to the outer circumference of the cylinder 10 and configured to support a first side of the spring 30, and an upper spring seat 32 attached to an outer circumference on an axial second side of the piston rod 20 and configured to support a second side of the spring 30. A lower seat rubber 35 is interposed between the first side of the spring 30 and the lower spring seat 31, and an upper seat rubber 36 is interposed between the second side of the spring 30 and the upper spring seat 32.

The suspension apparatus 100 has a vehicle wheel side attachment section 40 provided in a lower section of the cylinder 10. In contrast, bolts 33 for attaching the suspension apparatus 100 to a vehicle body are attached to the upper spring seat 32.

The suspension apparatus 100 includes a rubber bumper 41 that is pressed onto the outer circumference of the piston rod 20 that projects from the cylinder 10, and a rubber bumper cap 42 disposed in an outer circumference section of the rubber bumper 41. The suspension apparatus 100 includes a bumper stopper cap 43 mounted on a sliding section of the cylinder 10 against the piston rod 20. The cap plate 43a is attached to the bumper stopper cap 43, and the rubber bumper 41 collides with the cap plate 43a when the suspension apparatus 100 is compressed to as much as possible.

The suspension apparatus 100 includes the dust cover 50 which has a second end section mounted on an outer circumference of the rubber bumper cap 42 and a first end section mounted on the lower spring seat 31, and which is configured to cover the outer circumference of the cylinder 10 and the piston rod 20 between the first end section and the second end section. The first end section of the dust cover 50 is tightened to the lower spring seat 31 using a tightening ring (not illustrated), a tightening piece, and the like.

The suspension apparatus 100 includes a plurality (two in Embodiment 1) of rubber mounts 61 vertically disposed on the second side of the piston rod 20 and configured to absorb vibration; a cylindrical mount collar 62 disposed on the inside of the plurality of rubber mounts 61; and an upper washer 63 and a lower washer 64 between which the plurality of rubber mounts 61 are interposed in a vertical direction. The upper rubber mount 61 of the plurality of rubber mounts 61 is inserted into a concavity of the upper spring seat 32, a second end section of which is concave inwardly. A second end section and an outer circumference of the lower rubber mount 61 are covered by the rubber mount cap 65 disposed on a first side of the upper spring seat 32.

The dust cover 50 is a bellows-like member, and as illustrated in FIGS. 1 and 2, the second end section of the dust cover 50 covers an outer circumference of the rubber cover cap 42, and the first end section thereof is mounted on the lower spring seat 31. The dust cover 50 is disposed between the spring 30 and both the cylinder 10 and the piston rod 20, and covers the outer circumference of the cylinder 10 and the piston rod 20.

The dust cover 50 will be described in detail later.

Figure 2A:
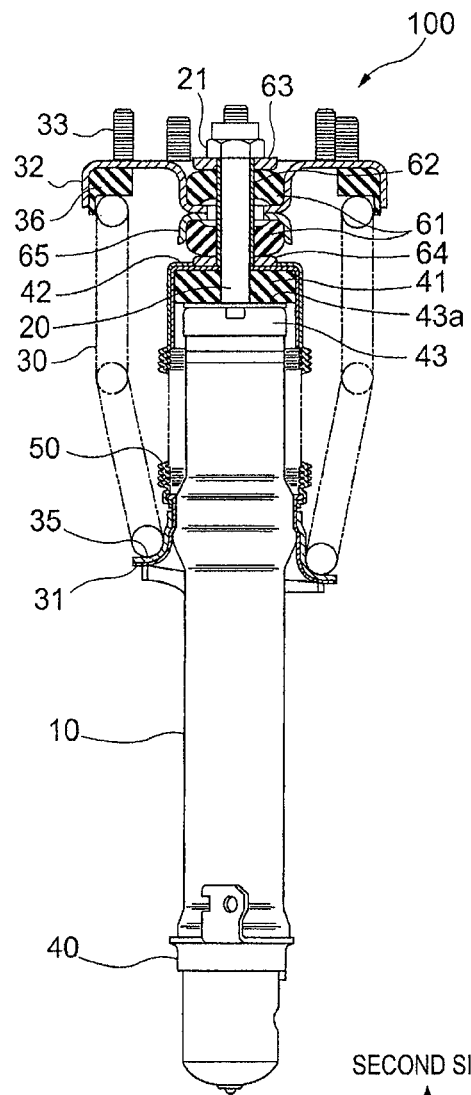
FIG. 2A is a view illustrating a compressed state of the suspension apparatus.
Figure 2B:
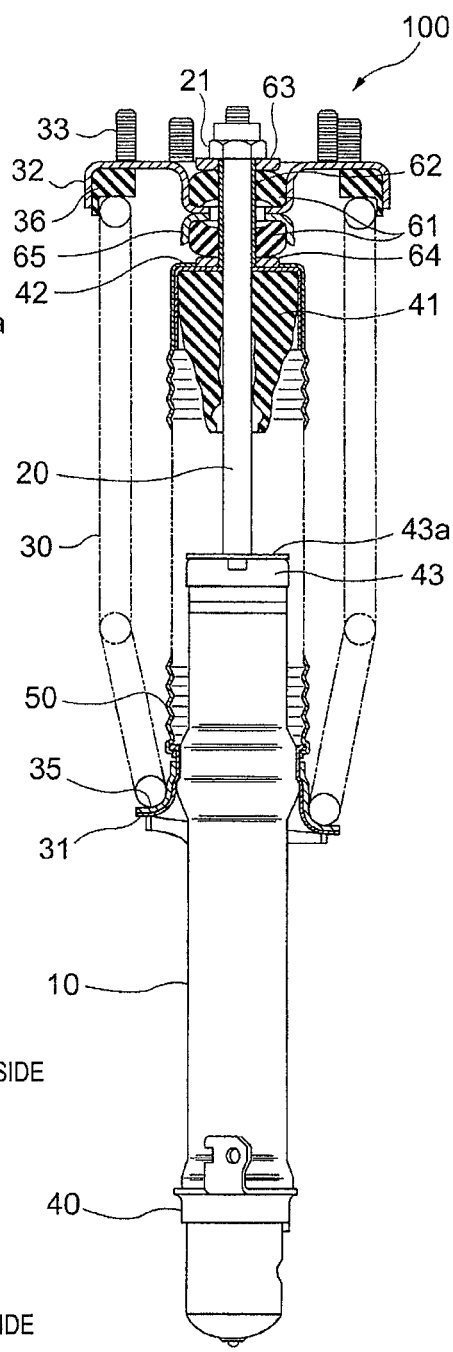
FIG. 2B is a view illustrating an extended state of the suspension apparatus.

FIG. 2A is a view illustrating a compressed state of the suspension apparatus 100, and FIG. 2B is a view illustrating an extended state of the suspension apparatus 100.

An operation state of the suspension apparatus 100 changes between the compressed state illustrated in FIG. 2A, and the extended state illustrated in FIG. 2B. The suspension apparatus 100 works as a shock absorber configured to dampen a shock and to prevent roughness in a road surface from being transmitted to the vehicle body by controlling extensional and compressional vibration of the spring 30 via the damper device built into the cylinder 10 and the spring 30 absorbing a shock from the road surface, and the suspension apparatus 100 works to press the vehicle body against the road surface. Accordingly, the ride quality or the steering stability of a vehicle is improved. A bellows-like section in the dust cover 50 moves axially in association with an extension and compression operation of the suspension apparatus 100.

Dust Cover 50

Figure 3:
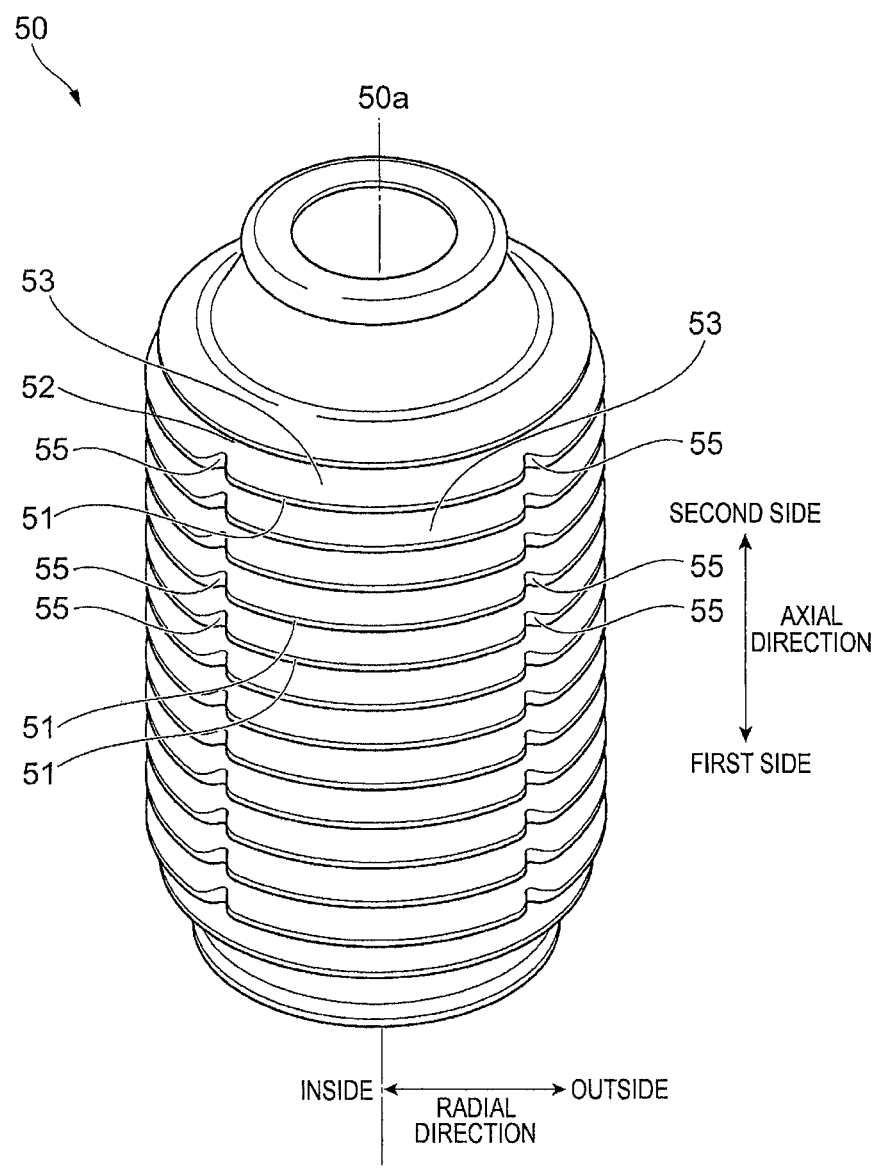
FIG. 3 is a schematic view illustrating the entirety of a dust cover of Embodiment 1.

FIG. 3 is a schematic view illustrating the entirety of the dust cover 50 of Embodiment 1.

In the following description a lateral direction of the dust cover 50 illustrated in FIG. 3 may simply refer to a "radial direction", and a side of a center axis 50a may refer to the "inside" in the radial direction, and an opposite side of the center axis 50a may refer to the "outside" in the radial direction.

As illustrated in FIG. 1, the dust cover (cover member) 50 of Embodiment 1 is formed in a cylindrical shape in the axial direction of the suspension apparatus (shock absorber) 100 configured to absorb a shock, and is extendable and compressible in the axial direction, or can be bent. As illustrated in FIG. 3, the dust cover 50 has the plurality of peak sections 51 provided in the axial direction and configured to protrude outward in the radial direction, the plurality of valley sections 52 provided in the axial direction and configured to protrude inward in the radial direction, and the plurality of connection sections 53 provided in the axial direction and configured to connect the peak sections 51 and the valley sections 52. In the dust cover 50, at least one of the axial concave section 55 formed in the axial direction and the axial convex section 56 formed in the axial direction is provided in at least any of the peak section 51, the valley section 52, and the connection section 53 (In the embodiment, the peak section 51 is provided with the axial concave section 55 formed in the axial direction).

Hereinafter, the dust cover 50 will be described in detail.

The dust cover 50 has the plurality of peak sections 51, the plurality of valley sections 52, and the connection sections 53 configured to connect the peaks 51 and the valley sections 52, all of which are alternately disposed in a direction of the center axis 50a. The dust cover 50 of Embodiment 1 has the axial concave sections 55 provided axially, and radial concave sections (peak-section radial concave sections 70 and valley-section radial concave sections 80 which will be described later) provided radially.

The dust cover 50 is extendable and compressible in the direction (the direction of the center axis 50a) in which the plurality of peak sections 51 and the plurality of valley sections 52 are respectively disposed side by side. The dust cover 50 can be bent in a direction intersecting the center axis 50a. When the dust cover 50 is mounted on the suspension apparatus 100, the dust cover 50 is disposed in such a manner that the center axis 50a of the dust cover 50 overlaps a center axis of the cylindrical shape or the columnar shape of the piston rod 20. The plurality of peak sections 51 and the plurality of valley sections 52 of the dust cover 50 are respectively disposed side by side in the axial direction of the cylindrical shape or the columnar shape of the piston rod 20, and the dust cover 50 is extended and compressed in the axial direction (refer to FIG. 2).

Axial Concave Section 55

Figure 4:
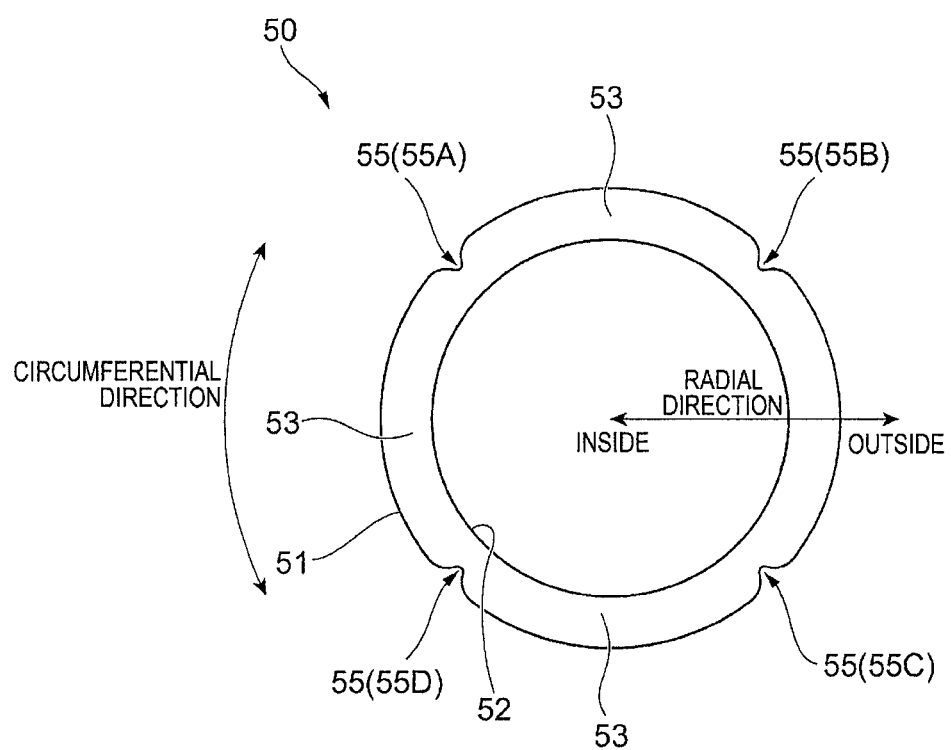
FIG. 4 is a view illustrating an axial concave section of the dust cover of Embodiment 1.

FIG. 4 is a view illustrating the axial concave section 55 of the dust cover 50 of Embodiment 1. FIG. 4 is a cross-sectional view (radial cross-sectional view) taken along the radial direction substantially perpendicular to the axial direction of the dust cover 50.

As illustrated in FIG. 3, the axial concave section 55 is formed in the peak section 51. Specifically, the axial concave sections 55 are provided by cutting away parts of the peak sections 51 from the first side to the second side along the axial direction of the dust cover 50, the peak sections 51 being axially disposed side by side. In Embodiment 1, the peak section 51 is provided with the axial concave section 55 that is concave inwardly from the outside in the radial direction.

In the embodiment, the "axial direction" implies a substantially axial direction, and may be an oblique direction with respect to the axial direction of the dust cover 50.

As illustrated in FIG. 4, a plurality of the axial concave sections 55 are provided in each one of the plurality of peak sections 51 provided side by side in the axial direction of the dust cover 50. As illustrated in FIG. 4, the axial concave sections 55 of Embodiment 1 are provided at multiple locations (4 locations in Embodiment 1) in a circumferential direction of the dust cover 50. In Embodiment 1, the plurality of axial concave sections 55 are disposed while being substantially evenly spaced in the circumferential direction. In Embodiment 1, since the axial concave sections 55 are provided at four locations in the circumferential direction, the axial concave sections 55 are disposed at an interval of substantially 90°. Accordingly, in the circumferential direction of one peak section 51, the circumferential length of the peak section 51 of the dust cover 50 between an axial concave section 55 and one axial concave section 55 adjacent to the axial concave section 55 is the same as that between and the axial concave section 55 and the other axial concave section 55 adjacent to the axial concave section 55 (for example, the circumferential length of the peak section 51 between an axial concave section 55A and an axial concave section 55B is the same as the circumferential length of the peak section 51 between the axial concave section 55A and an axial concave section 55D).

In the embodiment, the "same length" implies that the circumferential lengths may be exactly the same or substantially the same.

As illustrated in FIG. 4, the axial concave section 55 is formed in a substantially triangular shape having curved sections in the radial cross-sectional view. In Embodiment 1, the axial concave sections 55 are formed to have the same circumferential length (width). That is, in Embodiment 1, the plurality of axial concave sections 55 are configured to have the same shape.

In Embodiment 1, for example, the axial concave sections 55 are respectively formed at the same circumferential position (phase) in one peak section 51 and another peak section 51 different from the one peak section 51 among the plurality of peak sections 51 provided side by side in the axial direction of the dust cover 50. Accordingly, as illustrated in FIG. 3, the plurality of axial concave sections 55 are linearly disposed in the axial direction of the dust cover 50.

In the embodiment, the "linear disposition" implies that the axial concave sections 55 may be disposed exactly linearly or substantially linearly. The "same position" implies that the axial concave sections 55 are disposed at the exact same circumferential position or substantially the same circumferential position.

(Radial Concave Section (Peak-Section Radial Concave Section 70 and Valley-Section Radial Concave Section 80)).

Figure 5A:
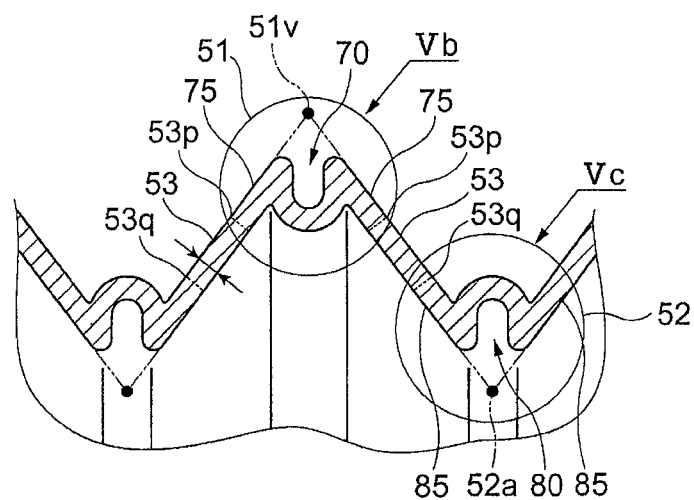
FIGS. 5A-5C are views illustrating a peak-section radial concave section and a valley-section radial concave section of the dust cover of Embodiment 1.
Figure 5B:
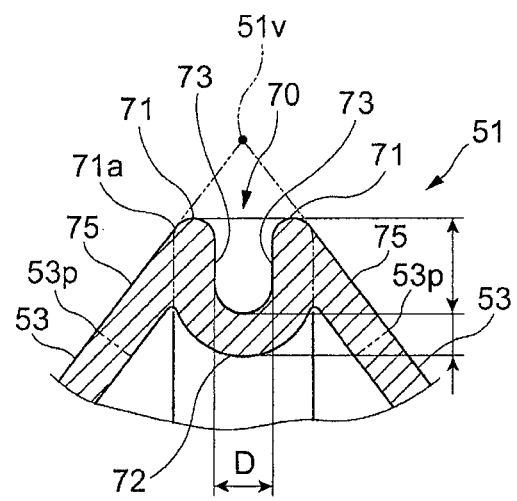
Figure 5C:
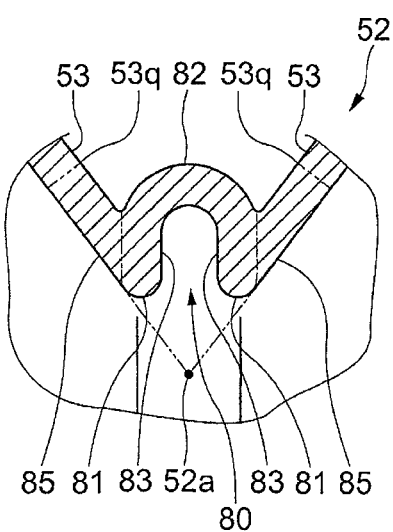

FIGS. 5A to 5C are views illustrating the peak-section radial concave section 70 and the valley-section radial concave section 80 of the dust cover 50 of Embodiment 1. FIG. 5A is a cross-sectional view (axial cross-sectional view) taken along the axial direction of the dust cover 50. FIG. 5B is an enlarged view of a Vb section illustrated in FIG. 5A, and FIG. 5C is an enlarged view of a Vc section illustrated in FIG. 5A.

As illustrated in FIG. 5A, the peak section 51 has the peak-section radial concave section (radial concave section) 70 concave inwardly (the side of the center axis 50a) from an apex 51v (a section in which outer surfaces of the adjacent connection sections 53 meet each other when extended) of the peak section 51, and a junction section 75 through which the peak-section radial concave section 70 is joined to the connection section 53. That is, the peak section 51 is provided with the peak-section radial concave section 70 that is concave radially opposite to the outside in the direction in which the peak section 51 protrudes.

As illustrated in FIG. 5A, the valley section 52 has the valley-section radial concave section (radial concave section) 80 concave radially opposite to the inside (the side of the center axis 50a) from a bottom 52a (a section in which inner surfaces of the adjacent connection sections 53 meet each other when extended) of the valley section 52, and a junction section 85 through which the valley-section radial concave section 80 is joined to the connection section 53. That is, the valley section 52 is provided with the valley-section radial concave section 80 that is concave radially opposite to the inside in the direction in which the valley section 52 protrudes.

As illustrated in FIG. 5A, the connection section 53 is a substantially linear section, and when a first end section 53p of the connection section 53 is joined to the junction section 75 of the peak section 51, and a second end section 53q is joined to the junction section 85 of the valley section 52, the connection section 53 connects the peak section 51 and the valley section 52.

The cross-sectional shape illustrated in FIG. 5A is formed over the entire circumference of the dust cover 50 except for the sections in which the axial concave sections 55 (to be described later) are formed.

As illustrated in FIG. 5B, the peak-section radial concave section 70 of the peak section 51 has a U-shaped cross section when viewed along a plane in parallel with the center axis 50a, and the peak-section radial concave section 70 has edge sections 71 which are tip end sections of two sides of the U shape; a bottom section 72 of the U shape; and a side section 73 between the edge section 71 and the bottom section 72. As illustrated in FIG. 5B, the exterior of the peak-section radial concave section 70 is joined to the connection section 53 via the junction section 75.

As illustrated in FIG. 5B, the edge section 71 is a section having a substantially semicircular shape. The bottom section 72 is a section having an arc shape, the center angle of which is substantially 180 degrees. In other words, the bottom section 72 is a section having a semicircumferential shape. The side section 73 is a substantially linear section through which the edge section 71 is joined to one end section of the bottom section 72.

The junction section 75 is a substantially linear section through which the exterior of the edge section 71, the bottom section 72, and the side section 73 are joined to the connection section 53. The length from the apex 51v to a junction section between the junction section 75 and the connection section 53, in other words, the length from the apex 51v to the first end section 53p of the connection section 53 is set to be Lm0 described later. The junction section between the junction section 75 and the connection section 53 is the boundary between the peak section 51 and the connection section 53.

As illustrated in FIG. 5C, the valley-section radial concave section 80 of the valley section 52 has a mountain-like (inverse U-shaped) cross section when viewed along a plane in parallel with the center axis 50a, and the valley-section radial concave section 80 has foot sections 81 which are foot sections of the mountain shape; an apex section 82 of the mountain shape; and a side section 83 between the foot section 81 and the apex section 82. As illustrated in FIG. 5C, an outside of the valley-section radial concave section 80 is joined to the connection section 53 via the junction section 85.

As illustrated in FIG. 5C, the foot section 81 is a section having a substantially semicircular shape. The apex section 82 is a section having an arc shape, the center angle of which is substantially 180 degrees. In other words, the apex section 82 is a section having a semicircumferential shape. The side section 83 is a substantially linear section through which the foot section 81 is joined to one end section of the apex section 82.

The junction section 85 is a substantially linear section through which an outside section of the foot section 81, the apex section 82, and the side section 83 is joined to the connection section 53. The length from the bottom 52a to a junction section between the junction section 85 and the connection section 53, in other words, the length from the bottom 52a to the second end section 53q of the connection section 53 is set to be Lb0 described later. The junction section between the junction section 85 and the connection section 53 is the boundary between the valley section 52 and the connection section 53.

Method of Manufacturing Dust Cover 50

The following materials can be used as the material for the dust cover 50: rubber; spring steel; rubber (thermoplastic elastomer or elastomer); cloth; elastically deformable synthetic resin (TPE); and synthetic resin made of polypropylene (PP) and ethylene-propylene-diene rubber (EPDM). It is possible to mold the dust cover 50 by putting resin into a mold having a mold section for forming at least axial concave section 55, and inflating resin in an inner surface shape of the mold via blow molding, injection molding, compression molding, or the like.

Hereinafter, the occurrence of contact noise when a dust cover 90 of a reference example is extended and compressed will be described.

FIGS. 6A to 6D are schematic views illustrating motions of the dust cover 90 of the reference example when extended and compressed.

As illustrated in FIGS. 6A to 6D, the dust cover 90 of the reference example has a peak section 91 configured to protrude outward in the radial direction; a valley section 92 configured to protrude inward in the radial direction; and a connection section 93 configured to connect the peak section 91 and the valley section 92.

When the dust cover 90 is axially compressed, the dust cover 90 transitions from an extended state illustrated in FIG. 6A to an initial compression state illustrated in FIG. 6B. As illustrated in FIG. 6B, tensile force is applied to the connection section 93 of the dust cover 90. At this time, as illustrated in FIG. 6C, in an axial cross section, the connection sections 93 are warped to axially separate from each other facing the second side in the axial direction of the dust cover 90. In other words, the dust cover 90 is deformed so as to form an axial space between the connection sections 93. Thereafter, as illustrated in FIG. 6D, when being restored to the original state, the connection sections 93 in the axial direction of the dust cover 90 are rapidly directed in the reverse direction and approach each other in the axial direction. In other words, the dust cover 90 is axially deformed in such a manner that the space (illustrated in FIG. 6C) between the connection sections 93 no longer exists. Due to a so-called reverse motion, one of the connection sections 93 comes into contact with the other connection section 93, and strikes the other connection section 93. As a result, when the dust cover 90 is extended and compressed, loud contact noise may occur.

In contrast, in the dust cover 50 (more specifically, the bellows-like axial concave sections 55 (in other words, local concave sections in the circumferential direction)) of Embodiment 1, it is possible to circumferentially break up the so-called axial reverse motions (in the embodiment, broken up into four) of the connection sections 53 associated with the extension and compression of the bellows-like dust cover 50. As a result, the axial concave sections 55 can break up rapid axial reverse motions of the connection sections 53 over the entire circumference, and reduce the occurrence of contact noise in the circumferentially divided connection sections 53. As a result, in the dust cover 50 of Embodiment 1, it is possible to prevent the occurrence of contact noise in the entirety of the connection sections 53.

A description to be given hereinafter relates to points of view other than the effects of preventing the occurrence of contact noise in the connection sections 53 in the dust cover 50 having the axial concave sections 55. The axial concave sections 55 (in other words, the local concave sections in the circumferential direction) can absorb radial shape deformations (expansion and contraction) of the connection sections 53 associated with the axial reverse motions of the connection sections 53. As a result, in the dust cover 50 of Embodiment 1, it is possible to reduce rapid axial reverse motions of the connection sections 53. That is, in the dust cover 50, it is possible to absorb a shape deformation associated with the reverse motions of the connection sections 53, and to prevent the occurrence of contact noise in the connection sections 53.

The dust cover 50 of Embodiment 1 has the peak-section radial concave sections 70 and the valley-section radial concave sections 80. Accordingly, it is possible to reduce a radial size of the dust cover 50, to improve the rigidity of the dust cover 50, and to decrease the amount of deformation of the dust cover 50 during a reverse motion. Since the dust cover 50 has the peak-section radial concave sections 70 and the valley-section radial concave sections 80, it is possible to reduce the total length of the dust cover 50. As a result, it is possible to reduce the number of connection sections 53 causing contact noise. As described above, since the dust cover 50 has the peak-section radial concave sections 70 and the valley-section radial concave sections 80, in the dust cover 50, it is possible to prevent the occurrence of contact noise in the connection sections 53.

In the dust cover 50, it is possible to further prevent the occurrence of contact noise in the connection sections 53 due to a combination of noise preventive effects in the axial concave sections 55 of the dust cover 50 and noise preventive effects of the radial concave sections (the peak-section radial concave sections 70 and the valley-section radial concave sections 80).

Hereinafter, in the embodiment, the effects of preventing the occurrence of contact noise in the connection sections 53 using the peak-section radial concave sections 70 and the valley-section radial concave sections 80 in the dust cover 50 of the embodiment will be described in detail from the viewpoint of (A) a reduction in the radial size of the dust cover 50, and (B) a reduction in the length of the dust cover 50 in an extension and compression direction when extended and compressed (reductions associated with the peak-section radial concave section 70 and the valley-section radial concave section 80).

The effects of preventing the occurrence of contact noise in the connection sections 53 using the peak-section radial concave sections 70 and the valley-section radial concave sections 80 in the dust cover 50 will be described in detail in comparison with a first comparative example and a second comparative example.

(A) Regarding Prevention of Occurrence of Contact Noise Through Reduction in Radial Size of Dust Cover 50

Figure 7:
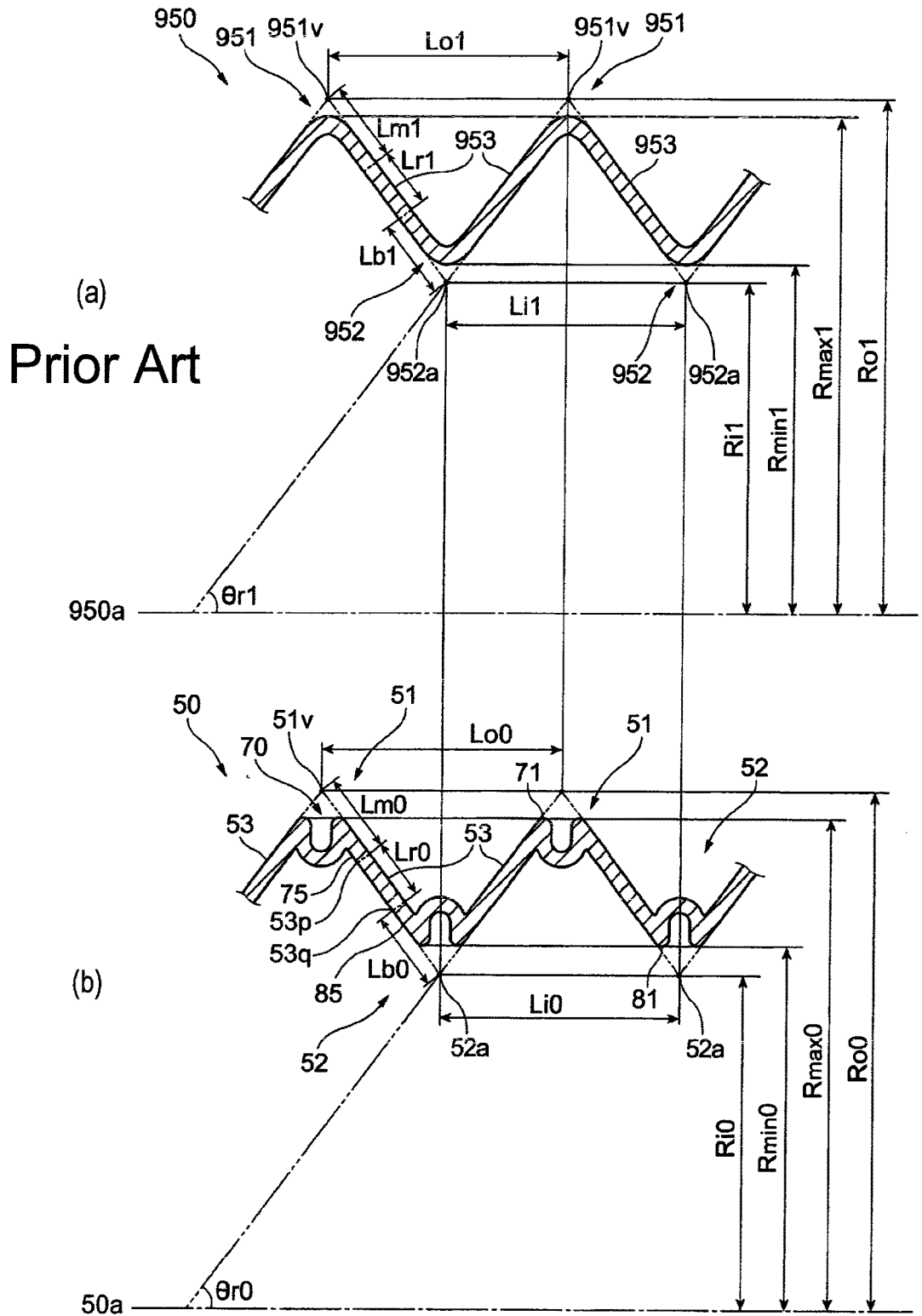

(a) in FIG. 7 is an enlarged cross-sectional view of a dust cover 950 of the first comparative example. (b) in FIG. 7 is an enlarged cross-sectional view of the dust cover 50 of Embodiment 1.

Similar to the dust cover 50 of Embodiment 1, the dust cover 950 of the first comparative example has a plurality of peak sections 951, a plurality of valley sections 952, and a plurality of connection sections 953. However, unlike the dust cover 50 of Embodiment 1, in the dust cover 950 of the first comparative example, the peak section 951 is not provided with a section that is concave inwardly from an apex 951v, and the valley section 952 is not provided with a section configured to protrude outward from a bottom 952a.

In the dust cover 950 of the first comparative example, a distance Ro1, a distance Ri1, a length Lr1, a distance Lm1, and a distance Lb1 refer respectively to the distance from a center axis 950a to the apex 951v, the distance from the center axis 950a to the bottom 952a, the length of the connection section 953, the distance from the apex 951v to the peak section 951, and the distance from the bottom 952a to the valley section 952. In the dust cover 50 of Embodiment 1, the distance Ro0, a distance Ri0, a length Lr0, the distance Lm0, and a distance Lb0 refer respectively to the distance from the center axis 50a to the apex 51v, the distance from the center axis 50a to the bottom 52a, the length of the connection section 53, the distance from the apex 51v to the peak section 51, and the distance from the bottom 52a to the valley section 52. The distance Ro1, the distance Ri1, the length Lr1, the distance Lm1, and the distance Lb1 are respectively set to be the same as the distance Ro0, the distance Ri0, the length Lr0, the distance Lm0, and the distance Lb0.

In the dust cover 950 of the first comparative example, a distance Lo1, a distance Li1, and an incline angle θr1 refer respectively to the distance between the adjacent peak sections 951 (the apexes 951v), the distance between the valley sections 952 (the bottoms 952a), and the incline of the connection section 953 with respect to the center axis 950a. In the dust cover 50 of Embodiment 1, a distance Lo0, a distance Li0, and an incline angle θr0 refer respectively to the distance between the adjacent peak sections 51 (the apexes 51v), the distance between the valley sections 52 (the bottoms 52a), and the incline of the connection section 53 with respect to the center axis 50a. The distance Lo1, the distance Li1, and the incline angle θr1 are respectively set to be the same as the distance Lo0, the distance Li0, and the incline angle θr0.

In the dust cover 50 of Embodiment 1, the peak section 51 is provided with the peak-section radial concave section 70 that is concave inwardly from the apex 51v, and the valley section 52 is provided with the valley-section radial concave section 80 that protrudes outward from the bottom 52a. For this reason, as illustrated in (a) and (b) in FIG. 7, a distance Rmax0 from the center axis 50a to the tip of the edge section 71 of the peak section 51, which is an outermost section of the dust cover 50 of Embodiment 1, is less than a distance Rmax1 from the center axis 950a to the tip of the peak section 951 which is an outermost section of the dust cover 950 of the first comparative example (Rmax0<Rmax1). A distance Rmin0 from the center axis 50a to the tip of the foot section 81 of the valley section 52, which is an innermost section is greater than a distance Rmin1 from the center axis 950a to the tip of the valley section 952 which is an innermost section (Rmin0>Rmin1).

That is, since the dust cover 50 of Embodiment 1 has the peak-section radial concave section 70 and the valley-section radial concave section 80, the dust cover 50 can have a radial size smaller than that of the dust cover 950 of the first comparative example.

As described above, since the dust cover 50 of Embodiment 1 can have a reduced radial size, the dust cover 50 can have higher rigidity than that of the dust cover 950 of the first comparative example, and as a result, it is possible to prevent the connection sections 53 from undergoing reverse motions. A reduction in the radial size of the dust cover 50 can reduce the amount of axial deformation associated with the reverse motions of the connection sections 53.

That is, since the dust cover 50 includes the peak-section radial concave section 70 and the valley-section radial concave section 80, it is possible to prevent the connection sections 53 from undergoing the reverse motions, and to prevent the occurrence of contact noise in the connection sections 53.

The total length of the connection section 53, the junction section 75 and the junction section 85, each of which is thin in the dust cover 50 of Embodiment 1 is less than that of a thin section from the tip of the peak section 951 to the tip of the valley section 952 in the dust cover 950 of the first comparative example. In the dust cover 50 of Embodiment 1, the thickness of the connection section 53 is thinner than that of a section in which the peak-section radial concave section 70 of the peak section 51 is joined to the junction section 75, and that of a section in which the valley-section radial concave section 80 of the valley section 52 is joined to the junction section 85.

Accordingly, it is possible to reduce variations (variations during blow molding) in the thickness of the dust cover 50 by reducing the length of the thin connection section 53 and the like and increasing the thickness of both the peak section 51 and the valley section 52. As a result, in the dust cover 50, it is possible to more uniformly prevent the occurrence of contact noise associated with the reverse motions of the connection sections 53 in the axial direction.

(B) Regarding Prevention of Occurrence of Contact Noise by Reduction in Length of Dust Cover 50 in Extension and Compression Direction when Extended and Compressed (a) in FIG. 8 is an enlarged cross-sectional view of a dust cover 1050 of the second comparative example, and (b) in FIG. 8 is an enlarged cross-sectional view of the dust cover 50 of Embodiment 1.

The dust cover 1050 of the second comparative example has the following points of difference compared to the dust cover 950 of the first comparative example.

The distance Lo0 between the adjacent peak sections 51 (more specifically, the distance between the adjacent apexes 51v) in the dust cover 50 of Embodiment 1 is greater than the distance between adjacent peak sections 1051 (more specifically, a distance Lo3 between adjacent apexes 1051v) in the dust cover 1050 of the second comparative example (the distance Lo0 between the peak sections 51 of Embodiment 1>the distance Lo3 between the peak sections 1051 of the second comparative example).

Similarly, the distance between the adjacent valley sections 52, that is, a distance Li0 between the adjacent bottoms 52a in the dust cover 50 of Embodiment 1 is greater than the distance between adjacent valley sections 1052, that is, a distance Li3 between adjacent bottoms 1052a in the dust cover 1050 of the second comparative example.

When the total length of the dust cover 50 of Embodiment 1 is the same as that (not illustrated) of the dust cover 1050 of the second comparative example, the number of peak sections 51, valley sections 52, and connection sections 53 in the dust cover 50 of Embodiment 1 can be reduced to be less than the number of peak sections 1051, valley sections 1052, and connection sections 1053 in the dust cover 1050 of the second comparative example (the number of peak sections 51, valley sections 52, and "connection sections 53" in Embodiment 1<the number of peak sections 1051, valley sections 1052, and "connection sections 1053" in the second comparative example).

That is, since the dust cover 50 of Embodiment 1 can have a reduced number of the connection sections 53 which can be sources of the occurrence of contact noise, it is possible to better prevent an occurrence of contact noise in the dust cover 50 than in the dust cover 1050 of the second comparative example.

When the dust cover 50 is compressed to as much as possible, the length of the dust cover 50 in the extension and compression direction is reduced corresponding to the extent that the number of peak sections 51 and valley sections 52 is reduced in the dust cover 50. As a result, the total length of the dust cover 50 of Embodiment 1 when compressed to as much as possible is less than that of the dust cover 1050 of the second comparative example when compressed to as much as possible.

Embodiment 2

Figure 9A:
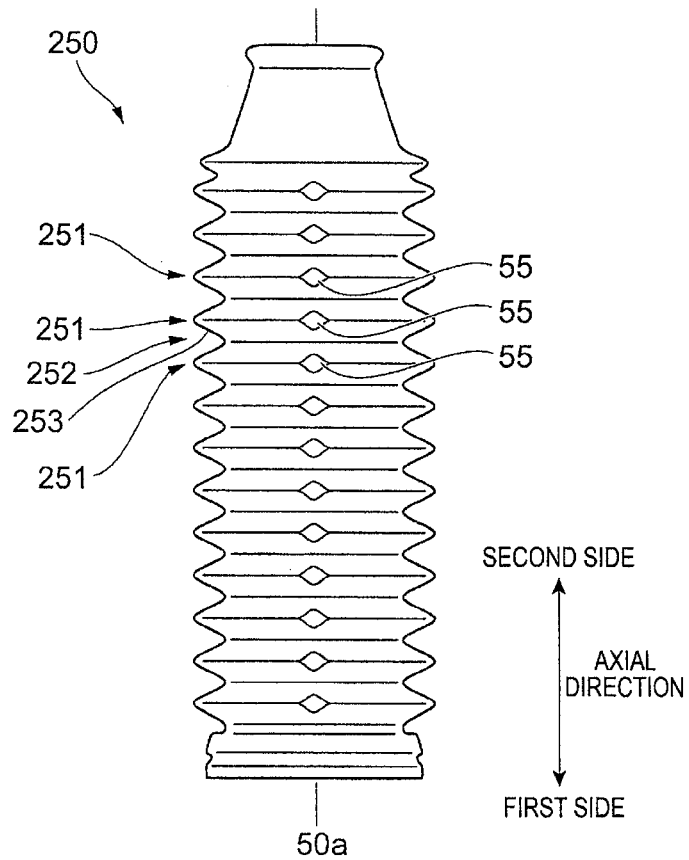
FIGS. 9A and 9B are views illustrating a dust cover of Embodiment 2.
Figure 9B:
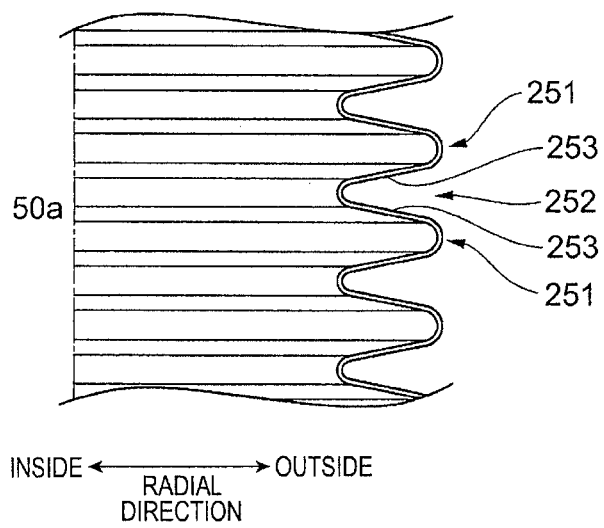

FIGS. 9A and 9B are views illustrating a dust cover 250 of Embodiment 2. FIG. 9A is a schematic view illustrating the entirety of the dust cover 250, and FIG. 9B is a cross-sectional view illustrating a partial axial part of the dust cover 250.

In the dust cover 50 of Embodiment 1, the axial concave section 55 is formed in the peak section 51; however, in the dust cover 50 of Embodiment 1, the peak-section radial concave section 70 and the valley-section radial concave section 80 are not necessarily formed in the peak section 51 and the valley section 52, respectively.

As illustrated in FIGS. 9A and 9B, the dust cover 250 of Embodiment 2 has a peak section 251 configured to protrude outward in the radial direction; a valley section 252 configured to protrude inward in the radial direction; and a connection section 253 configured to connect the peak section 251 and the valley section 252. In the dust cover 250 of Embodiment 2, neither the peak section 251 nor the valley section 252 has the peak-section radial concave section 70 or the valley-section radial concave section 80. As illustrated in FIG. 9A, in the dust cover 250 of Embodiment 2, the axial concave section 55 may be provided in the axial direction of the dust cover 250.

In the dust cover 250 of Embodiment 2, the axial concave sections 55 are provided in all of the peak sections 251 provided side by side in the axial direction. Accordingly, in the dust cover 250 of Embodiment 2, it is possible to prevent the occurrence of noise associated with the extension and compression of the dust cover 250 without changing a so-called contact length (the total length of the dust cover 250 when compressed to as much as possible).

Embodiment 3

Figure 10A:
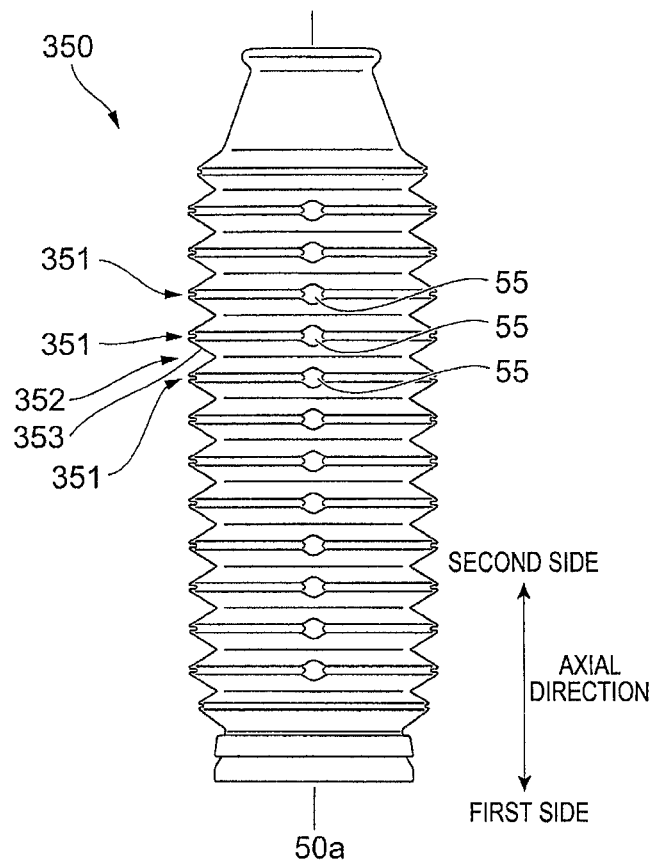
FIGS. 10A and 10B are views illustrating a dust cover of Embodiment 3.
Figure 10B:
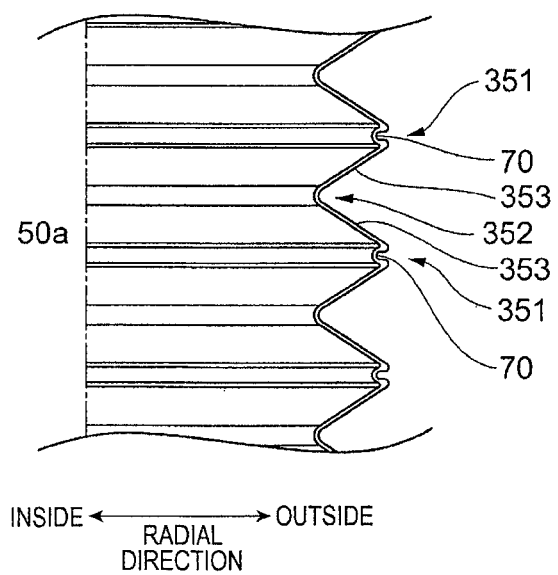

FIGS. 10A and 10B are views illustrating a dust cover 350 of Embodiment 3. FIG. 10A is a schematic view illustrating the entirety of the dust cover 350, and FIG. 10B is an axial partial cross-sectional view of the dust cover 350.

As illustrated in FIGS. 10A and 10B, in the dust cover 350 of Embodiment 3, the peak-section radial concave section 70 is formed only in peak section 351. The dust cover 350 of Embodiment 3 may be provided with the axial concave section 55.

As illustrated in FIGS. 10A and 10B, the dust cover 350 of Embodiment 3 has a peak section 351 configured to protrude outward in the radial direction; a valley section 352 configured to protrude inward in the radial direction; and a connection section 353 configured to connect the peak section 351 and the valley section 352. As illustrated in FIG. 10A, in the dust cover 350 of Embodiment 3, the axial concave sections 55 are provided in all of the peak sections 351 provided side by side in the axial direction. Since the peak section 351 is provided with the peak-section radial concave section 70, it is possible to increase the rigidity of the dust cover 350 (more specifically, bellows-like sections of the dust cover 350), and to actually reduce the length of the connection section 353 between the peak section 351 and the valley section 352. For this reason, it is possible to prevent the extension and compression of the bellows-like sections from causing rapid axial reverse motions of the connection sections 353, and to reduce the amount of reverse deformation (in other words, the amount of warping in the axial direction) of the connection section 353 in the axial direction when the connection sections 353 undergo axial reverse motions.

By virtue of the peak-section radial concave section 70, it is possible to reduce the number of peak sections 351, the number of valley sections 352, and the number of connection sections 353 configured to connect the peak section 351 and the valley section 352 in the axial direction. That is, since it is possible to reduce the number of connection sections 353 that undergo the rapid axial reverse motions associated with the extension and compression of the dust cover 350, it is possible to reduce the number of contacts between the connection sections 353. The details are the same as described in Embodiment 1.

It is possible to further prevent the occurrence of contact noise associated with the extension and compression of the bellows-like dust cover 350 due to a combination of noise preventive effects associated with a reduction in the reverse motions of the connection sections 353, a reduction in the amount of reverse motion of the connection sections 353, and a reduction in the number of connection sections 353, with all of the reductions originating from the formation of the peak-section radial concave section 70, and noise preventive effects associated with the breaking up of the axial reverse motions of the connection sections 353 by the axial concave sections 55.

MODIFICATION EXAMPLES

Modification Examples 1 to 9 hereinbelow will be described based on the basic configuration of the dust cover 50 of Embodiment 1.

Modification Example 1

Regarding Position of Formation of the Axial Concave Section 55

Figure 11A:
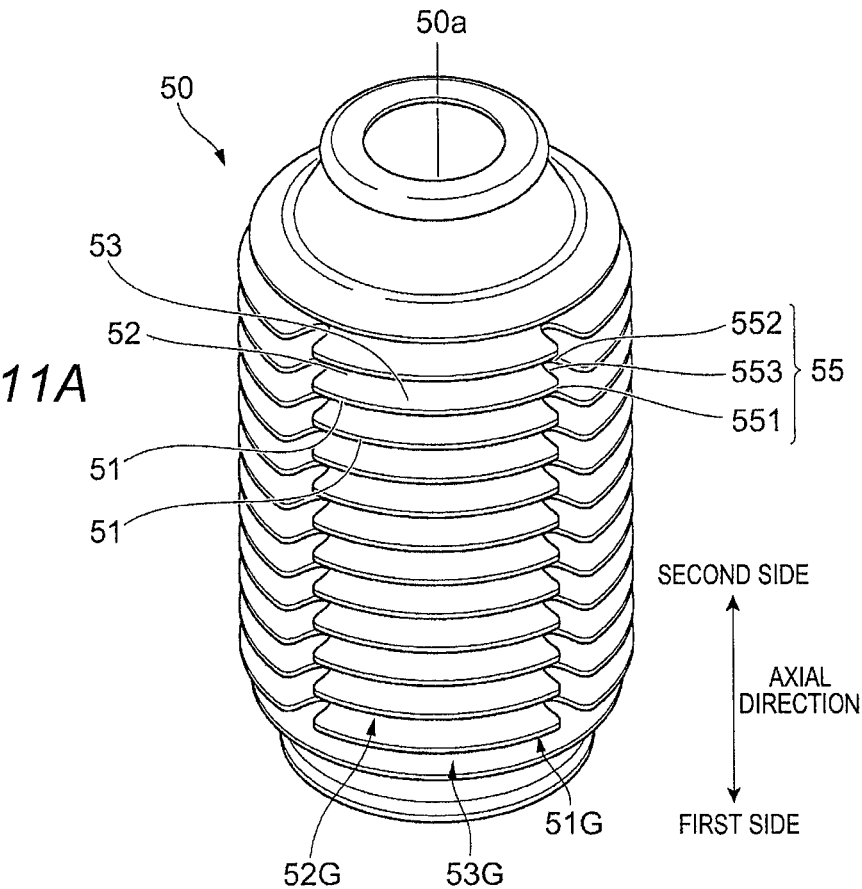
FIGS. 11A and 11B are views illustrating the dust cover of Modification Example 1.
Figure 11B:
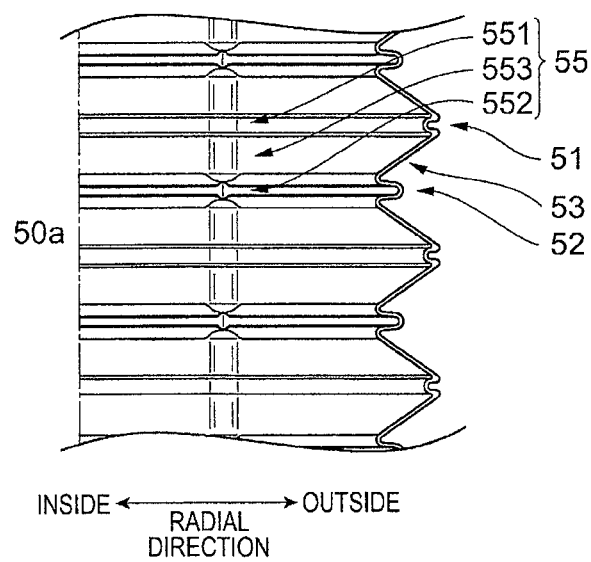

FIGS. 11A and 11B are views illustrating the dust cover 50 of Modification Example 1. FIG. 11A is a schematic view illustrating the entirety of the dust cover 50 of Modification Example 1. FIG. 11B is a vertical cross-sectional view of the dust cover 50 of Modification Example 1.

In the dust cover 50 of the embodiment, the peak section 51 is provided with the axial concave section 55; however, for example, as illustrated in FIG. 11A, axial concave sections (a peak-section axial concave section 551, a valley-section axial concave section 552, and a connection-section axial concave section 553) may be respectively provided in the peak section 51, the valley section 52, and the connection section 53 configured to connect the peak section 51 and the valley section 52.

In the dust cover 50 of Modification Example 1, as illustrated in FIG. 11B, the axial concave section 55 is configured to include the peak-section axial concave section 551 formed in the peak section 51; the valley-section axial concave section 552 formed in the valley section 52; and the connection-section axial concave section 553 formed in the connection section 53. In the dust cover 50, the axial concave sections 55 are respectively formed in the peak sections 51, the valley sections 52, and the connection sections 53, all of which are respectively provided side by side in the axial direction.

In the dust cover 50 of the embodiment, a peak section group 51G refers to the entirety of the peak sections 51 provided side by side in the axial direction, a valley section group 52G refers to the entirety of the valley sections 52 provided side by side in the axial direction, and a connection section group 53G refers to the entirety of the connection sections 53 provided side by side in the axial direction.

The peak-section axial concave section 551, the valley-section axial concave section 552, and the connection-section axial concave section 553 are circumferentially disposed to form one axial concave section 55, and are formed at the same position in the circumferential direction of the dust cover 50. That is, the axial concave section 55 is formed at (substantially) the same circumferential position in each of the peak section 51, the valley section 52, and the connection section 53, all of which are respectively provided side by side in the axial direction. Accordingly, as illustrated in FIG. 11A, the axial concave sections 55 are formed substantially linearly in the axial direction in the entirety of the dust cover 50.

Accordingly, the number of axial concave sections 55 in the dust cover 50 of Modification Example 1 is greater than that of the axial concave sections 55 provided in only the peak sections 51 of the dust cover 50 of Embodiment 1. Accordingly, in this modification example, the axial concave sections 55 formed locally in the circumferential direction of bellows-like sections of the dust cover 50 are formed in an axial row in the entirety of the bellows-like sections. Accordingly, in Modification Example 1, the axial concave sections 55 can more easily circumferentially break up rapid axial reverse motions of the connection sections 53 associated with the extension and compression of the dust cover 50. As a result, it is possible to reduce the rapid axial reverse motions of the connection sections 53 over the entire circumference, and to reduce noise that is induced by contact between the connections sections 53 provided side by side in the axial direction. Accordingly, in the modification example, it is possible to reduce the contact length of the dust cover 50, and to actively prevent an occurrence of noise associated with the extension and compression of the dust cover 50.

Modification Example 2

Regarding Formation of Axial Concave Section 55 in Entirety of Dust Cover 50

FIGS. 12A to 12C are views illustrating the dust covers 50 of Modification Example 2. FIG. 12A is a schematic view illustrating the entirety of the dust cover 50 in which the axial concave sections 55 are substantially linearly provided while being inclined at a predetermined angle with respect to the axial direction. FIG. 12B is a schematic view illustrating the entirety of the dust cover 50 in which the axial concave sections 55 are provided such that the axial concave sections 55 are alternately directed in a clockwise direction and in a counter-clockwise direction with respect to the dust cover 50. FIG. 12C is a schematic view illustrating the entirety of the dust cover 50 in which the axial concave sections 55 are provided discontinuously in the axial direction of the dust cover 50.

When a description will be given while differentiating between the peak sections 51 provided side by side in the axial direction, the peak sections 51 will be differentiated by adding a letter to the end of the reference sign as an uppermost peak section 51 which is referred to as a "peak section 51a", and a second uppermost peak section 51 which is referred to as a "peak section 51b".

In the dust cover 50 of Embodiment 1, the axial concave sections 55 are provided in the peak sections 51 (provided side by side in the axial direction) along the axial direction (the extension and compression direction) of the dust cover 50; however, as illustrated in FIGS. 12A and 12B, the axial concave sections 55 may not be formed along the axial direction (the extension and compression direction) of the dust cover 50.

For example, the axial concave sections 55 may be substantially linearly formed while being inclined by a predetermined angle with respect to the axial direction of the dust cover 50, or the axial concave sections 55 may be formed such that the axial concave sections 55 are alternately directed in the clockwise direction CW and in the counterclockwise direction CCW in the circumferential direction of the dust cover 50.

In the dust cover 50 illustrated in FIG. 12A, the axial concave sections 55 are formed in all of the peak sections 51 provided side by side in the axial direction. The axial concave section 55 in the uppermost peak section 51a is formed at a position A in the circumferential direction. The axial concave section 55 in the second uppermost peak section 51b is formed at a position B that is rotated in the clockwise direction CW from the circumferential position A of the uppermost axial concave section 55. The axial concave section 55 in a third uppermost peak section 51c is formed at a position C that is rotated in the clockwise direction CW from the circumferential position B of the second uppermost axial concave section 55. In summary, the axial concave sections 55 are formed substantially linearly in the clockwise direction CW from the uppermost peak section 51a to a lowermost peak section 51.

In the dust cover 50 illustrated in FIG. 12B, the axial concave sections 55 are formed in all of the peak sections 51 provided side by side in the axial direction. In summary, the axial concave sections 55 are formed such that the axial concave sections 55 are alternately directed in the clockwise direction CW and in the counterclockwise direction CCW in the circumferential direction of the dust cover 50.

More specifically, in an axial view, the axial concave sections 55 are formed substantially linearly in the clockwise direction CW from the uppermost peak section 51a to a fourth uppermost peak section 51d. The axial concave sections 55 are formed substantially linearly in the counter-clockwise direction CCW from the fourth uppermost peak section 51d to a seventh uppermost peak section 51g. The axial concave sections 55 are formed substantially linearly in the clockwise direction CW from the seventh uppermost peak section 51g to a tenth uppermost peak section 51j. The axial concave sections 55 are formed substantially linearly in the counterclockwise direction CCW from the tenth uppermost peak section 51j to a twelfth uppermost peak section 51l.

In the dust covers 50 with this configuration of the modification example illustrated in FIGS. 12A and 12B, it is possible to prevent the occurrence of noise associated with the extension and compression of the dust cover 50 without considerably changing the contact length of the dust cover 50.

In the dust covers 50 (more specifically, the peak sections 51) of the modification example illustrated in FIGS. 12A and 12B, the axial concave sections 55 are "substantially linearly" and obliquely formed; however, the axial concave sections 55 may be "obliquely curvedly" formed.

As illustrated in FIG. 12C, the axial concave sections 55 may be intermittently provided in the plurality of peak sections 51 provided side by side in the axial direction of the dust cover 50. More specifically, the axial concave section 55 is not formed in the uppermost peak section 51a, and the axial concave section 55 is formed in the second uppermost peak section 51b. The axial concave section 55 is not formed in the third uppermost peak section 51c, and the axial concave section 55 is formed in the fourth uppermost peak section 51d. In summary, the axial concave sections 55 are not necessarily formed in all of the peak sections 51 in the axial direction, and may be formed in some of the plurality of peak sections 51 provided side by side in the axial direction.

Modification Example 3

Regarding Formation of Axial Convex Section 56

FIG. 13 is a view illustrating the dust cover 50 of Modification Example 3.

In the dust cover 50 of Embodiment 1, the axial concave section 55 is provided in the peak section 51; however, for example, as illustrated in FIG. 13, the axial concave section 55 is not provided and an axial convex section 56 may be provided in the peak section 51.

As illustrated in FIG. 13, the dust cover 50 of Modification Example 3 has the axial convex section 56 configured to protrude outward in the axial direction. The axial convex section 56 is formed in a substantially triangular shape having curved sections. In the dust cover 50 of Modification Example 3, the axial convex sections 56 are provided in all of the peak sections 51 (provided side by side in the axial direction) along the axial direction (the extension and compression direction) of the dust cover 50.

Accordingly, the axial convex section 56 formed in an axial row can circumferentially break up the axial shape deformations of the connection sections associated with the extension and compression of the bellows-like sections. The axial convex section 56 having "a hollow interior" forms a space that absorbs the radial extension and compression of the connection section 53. As a result, it is possible to reduce the axial shape deformation of the connection section 53. The axial convex sections 56 having hollow interiors can reduce rapid axial reverse motions of the connection sections 53 associated with the extension and compression of the bellows-like sections, and reduce noise induced by contact between the connection sections 53 provided side by side in the axial direction. Accordingly, in the dust cover 50 of Modification Example 3 illustrated in FIG. 13, it is possible to prevent the occurrence of contact noise associated with the extension and compression of the dust cover 50 without considerably changing the contact length of the dust cover 50.

In the dust cover 50 illustrated in FIG. 13, the axial convex section 56 has a hollow interior; however, the axial convex section 56 may have a solid interior so as to form the thickness of the dust cover 50. Also, when the axial convex section 56 does not have an interior space, and has a solid interior, the rapid axial reverse motions of the connection sections 53 associated with the extension and compression of the bellows-like sections of the dust cover 50 can be broken up in the circumferential direction of the dust cover 50, and it is possible to reduce the occurrence of noise (more specifically, noise induced by contact between the connections sections 53) associated with the extension and compression of the dust cover 50.

Modification Example 4

Regarding Shape of Axial Concave Section 55

FIGS. 14A to 14D are views illustrating the dust covers 50 of Modification Example 4.

First, the axial concave section 55 will be described. In the dust cover 50 of Embodiment 1, in radial cross-sectional views, the axial concave section 55 in the peak section 51 is formed in a substantially triangular shape having curved sections; however, for example, the axial concave section 55 may be formed as illustrated in FIGS. 14A to 14D.

Figure 14A:
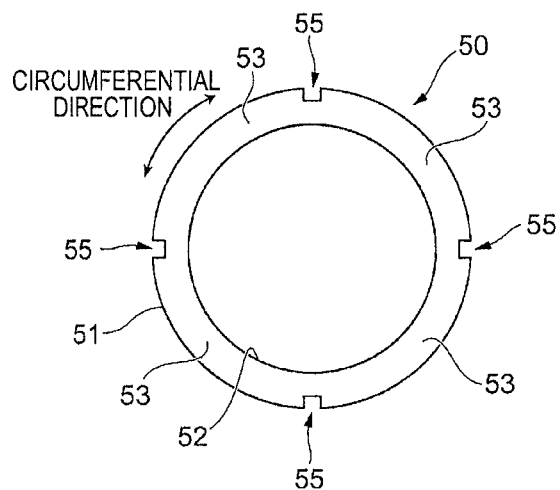
FIGS. 14A to 14D are views illustrating the dust covers of Modification Example 4.

As illustrated in FIG. 14A, in the radial cross-sectional view, the axial concave section 55 having a substantially rectangular shape may be provided in the peak section 51. Apex sections (corners) of the rectangular shape of the axial concave section 55 may be rounded, or the length of a side of the rectangular shape may be different from that of others.

Figure 14B:
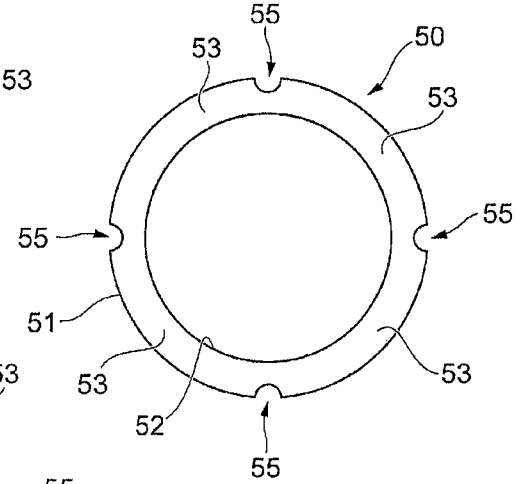

As illustrated in FIG. 14B, in the radial cross-sectional view, the axial concave section 55 having a substantially arced shape may be provided in the peak section 51. The opening angle, the curvature, the size, and the like of the arc shape of the axial concave section 55 are not limited to those of the shape illustrated in FIG. 14B.

Figure 14C:
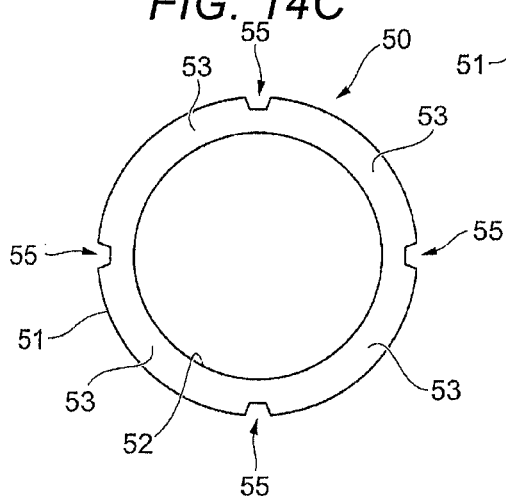

As illustrated in FIG. 14C, in the radial cross-sectional view, the axial concave section 55 having a substantially trapezoidal shape may be provided in the peak section 51. The shape of the axial concave section 55 is not limited to a trapezoidal shape, and may be formed in any other polygonal shape. Apex sections (corners) of the trapezoidal shape of the axial concave section 55 may be rounded, or the length of a side of the trapezoidal shape may be different from that of others.

Figure 14D:
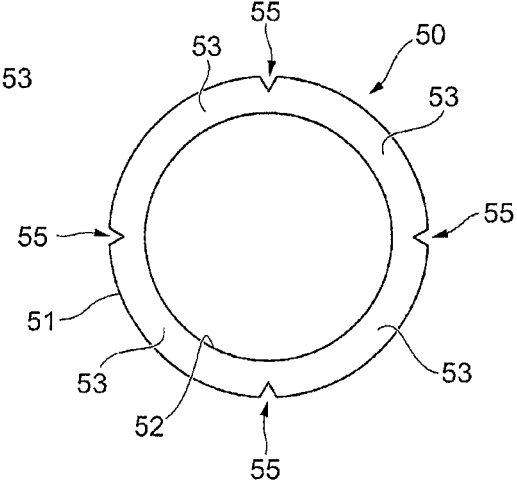

As illustrated in FIG. 14D, in the radial cross-sectional view, the axial concave section 55 of the peak section 51 may be formed in a substantially triangular shape having a non-curved apex different from that in Embodiment 1. The length of a side of the triangle may be different from that of others.

Modification Example 5

Regarding Shape of Axial Convex Section 56

FIGS. 15A to 15D are views illustrating the dust covers 50 of Modification Example 5.

Subsequently, the shape of the axial convex section 56 will be described. In the dust covers 50 of Modification Example 3, seen in the radial cross-sectional view, the axial convex section 56 in the peak section 51 has a substantially triangular shape having curved sections; however, for example, the axial convex section 56 may be formed as illustrated in FIGS. 15A to 15D.

In summary, similar to the axial concave section 55, the axial convex section 56 may be formed in a polygonal shape such as a substantially triangular shape, a substantially rectangular shape, a round shape, or a substantially trapezoidal shape, which protrudes in the radial direction of the peak section 51, the valley section 52, and the connection section 53. Hereinafter, the axial convex section 56 will be described in detail.

Figure 15A:
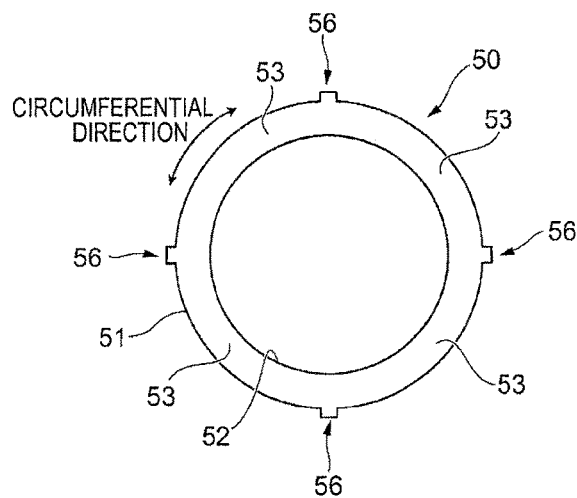
FIGS. 15A to 15D are views illustrating the dust covers of Modification Example 5.

As illustrated in FIG. 15A, in the radial cross-sectional view, the axial convex section 56 having a substantially rectangular shape may be provided in the peak section 51. Apex sections (corners) of the rectangular shape of the axial convex section 56 may be rounded, or the length of a side of the rectangular shape may be different from that of others.

Figure 15B:
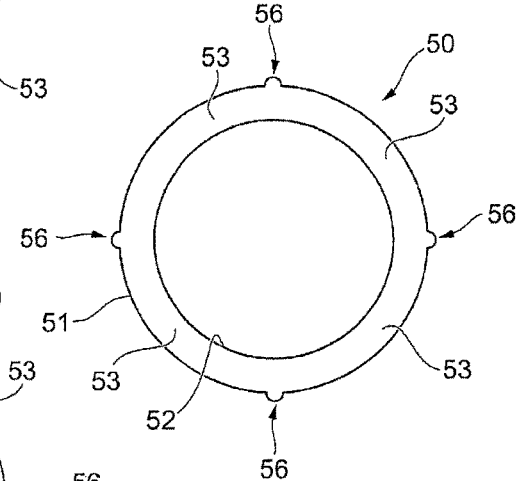

As illustrated in FIG. 15B, in the radial cross-sectional view, the axial convex section 56 having a substantially arced shape may be provided in the peak section 51. The opening angle, the size, and the like of the arc shape of the axial convex section 56 are not limited to those of the shape illustrated in FIG. 15B.

Figure 15C:
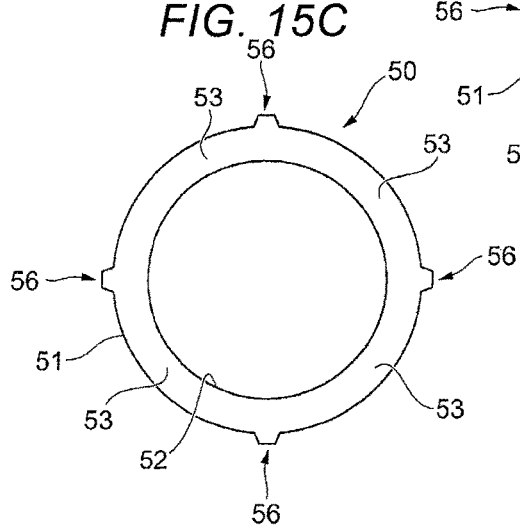

As illustrated in FIG. 15C, in the radial cross-sectional view, the axial convex section 56 having a substantially trapezoidal shape may be provided in the peak section 51. The shape of the axial convex section 56 is not limited to a trapezoidal shape, and may be formed in any other polygonal shape. Apex sections (corners) of the trapezoidal shape of the axial convex section 56 may be rounded, or the length of a side of the trapezoidal shape may be different from that of others.

Figure 15D:
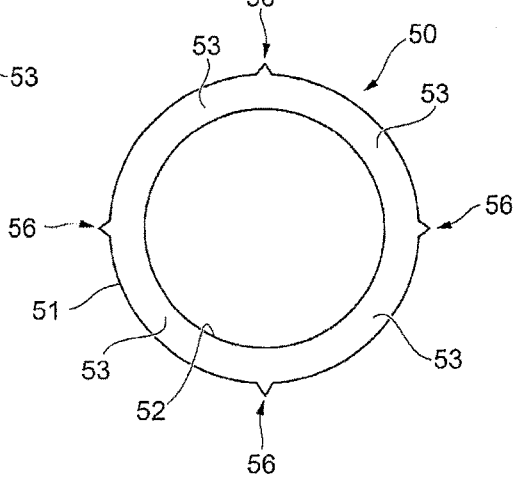

As illustrated in FIG. 15D, seen in the radial cross-sectional view, the axial convex section 56 of the peak section 51 may be formed in a substantially triangular shape having a non-curved apex different from that in Embodiment 1. The length of a side of the triangle of the axial convex section 56 may be different from that of others.

In the examples illustrated in FIGS. 14A to 14D and FIGS. 15A to 15D, both the axial concave section 55 and the axial convex section 56 are provided in the peak section 51; however, either the axial concave section 55 or the axial convex section 56 may be formed in the connection section 53 or the valley section 52.

The axial concave section 55 and the axial convex section 56 may be formed in the same shape in the axial direction, and may have different sizes in the axial direction.

In addition, the axial concave sections 55 having different shapes may be respectively formed in the peak section 51, the valley section 52, and the connection section 53, all of which are successively formed in the axial direction. For example, the axial concave section 55 having a substantially triangular shape may be formed in the uppermost peak section 51, and the axial concave section 55 having a substantially pentagonal shape may be formed in the second uppermost peak section 51. In addition, the axial concave section 55 having a substantially triangular shape may be formed in the peak section 51, and the axial concave section 55 having a substantially pentagonal shape may be formed in the valley section 52 or the connection section 53.

Similarly, the axial convex sections 56 having different shapes and/or different sizes may be respectively formed in the peak section 51, the valley section 52, and the connection section 53, all of which are successively formed in the axial direction.

Modification Example 6

Regarding Position of Formation of Axial Concave Section 55 and Axial Convex Section 56

Figure 16A:
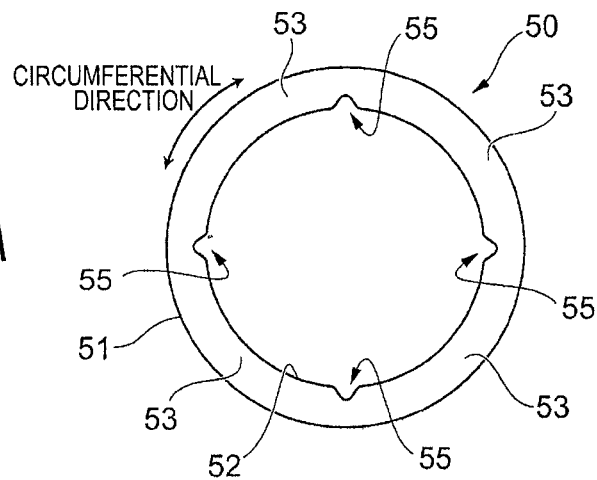
FIGS. 16A to 16C are views illustrating the dust covers of Modification Example 6.
Figure 16B:
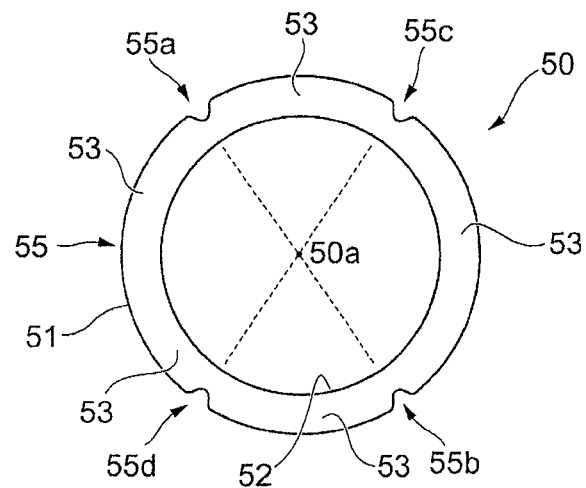
Figure 16C:
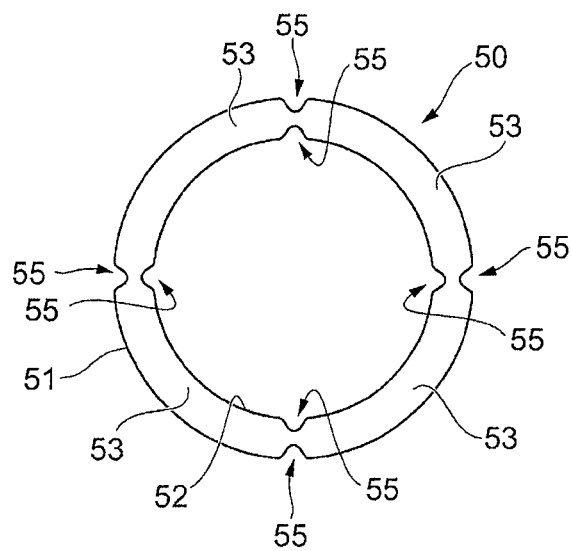

FIGS. 16A to 16C are views illustrating the dust covers 50 of Modification Example 6.

In the dust cover 50 of Embodiment 1, in the radial cross-sectional view, four axial concave sections 55 are disposed while being evenly circumferentially spaced by substantially 90°. However, for example, the axial concave sections 55 may be formed at circumferential positions (while being circumferentially spaced) as illustrated in FIGS. 16A to 16C.

As illustrated in FIG. 16A, in the radial cross-sectional view, the axial concave section 55 is formed in the valley section 52. Four axial concave sections 55 are formed while being circumferentially spaced by substantially 90°.

The adjacent axial concave sections 55 may be formed while not being evenly circumferentially spaced. For example, as illustrated in FIG. 16B, the axial concave sections 55 may be formed at positions which are point-symmetrical about the center axis 50a of the dust cover 50. A first axial concave section 55a and a second axial concave section 55b are disposed at positions which are point-symmetrical about the center axis 50a of the dust cover 50. A third axial concave section 55c and a fourth axial concave section 55d are formed at positions which are point-symmetrical about the center axis 50a of the dust cover 50. Here, the circumferential space between the first axial concave section 55a and the third axial concave section 55c is substantially the same as that between the second axial concave section 55b and the fourth axial concave section 55d. The circumferential space between the first axial concave section 55a and the fourth axial concave section 55d is substantially the same as that between the second axial concave section 55b and the third axial concave section 55c.

However, the circumferential space between the first axial concave section 55a and the third axial concave section 55c is different from that between the first axial concave section 55a and the fourth axial concave section 55d. Similarly, the circumferential space between the first axial concave section 55a and the third axial concave section 55c is different from that between the second axial concave section 55b and the third axial concave section 55c.

As illustrated in FIG. 16B, the axial concave sections 55 are not necessarily formed at the positions which are point-symmetrical about the center axis 50a of the dust cover 50, and the spaces between the circumferentially adjacent axial concave sections 55 may be different.

In the radial cross-sectional view illustrated in FIG. 16C, the axial concave sections 55 are respectively provided in the peak section 51 and the valley section 52. The axial concave section 55 of the peak section 51 and the axial concave section 55 of the valley section 52 are formed at the same phase position in the circumferential direction.

In FIG. 16C, in the radial cross-sectional view, the axial concave sections 55 are respectively formed at the same phase position in the peak section 51 and the valley section 52; however, the axial concave sections 55 may be formed at different phase positions. The phase positions of the axial concave sections 55 (or the axial convex section 56) respectively formed in the peak section 51 and the connection section 53 may be the same or different, and the phase positions of the axial concave sections 55 (or the axial convex section 56) respectively formed in the connection section 53 and the valley section 52 may be the same or different. The number of axial concave sections 55 of the peak section 51 may be different from that of the valley sections 52. In FIG. 16C, the axial concave sections 55 are formed in both the peak section 51 and the valley section 52; however, the axial concave section 55 may be formed in the peak section 51, and the axial convex section 56 may be formed in the valley section 52.

In the dust cover 50 illustrated in FIGS. 16A to 16C, the axial concave section 55 is formed in the peak section 51, and similarly, in the dust cover 50 provided with the axial convex section 56, the axial convex sections 56 may be formed in different circumferential positions.

Modification Example 7

Regarding Shape of Axial Concave Section 55 or Axial Convex Section 56

In Embodiment 1, when focusing on the axial concave sections 55 formed in one peak section 51, the axial concave sections 55 are substantially linearly formed in the axial direction; however, the axial concave sections 55 may not be linearly formed. The axial concave sections 55 may be formed obliquely with respect to an axial line of the dust cover 50, or axial partial sections may be inflated in the circumferential direction, which is not illustrated. For example, the axial concave section 55 may be inflated linearly or curvedly. Similarly, the aforementioned shape variations may be applied to the axial convex section 56.

Modification Example 8

Regarding Number of Axial Concave Sections 55 or Axial Convex Sections 56

The number of axial concave sections 55 or axial convex sections 56 of the peak section 51, the valley section 52, and the connection section 53 in the dust cover 50 is not limited to four illustrated in Embodiment 1, and may be one, or two or more, which is not illustrated.

Modification Example 9

Regarding Axial Length of Dust Cover 50

Figure 17A:
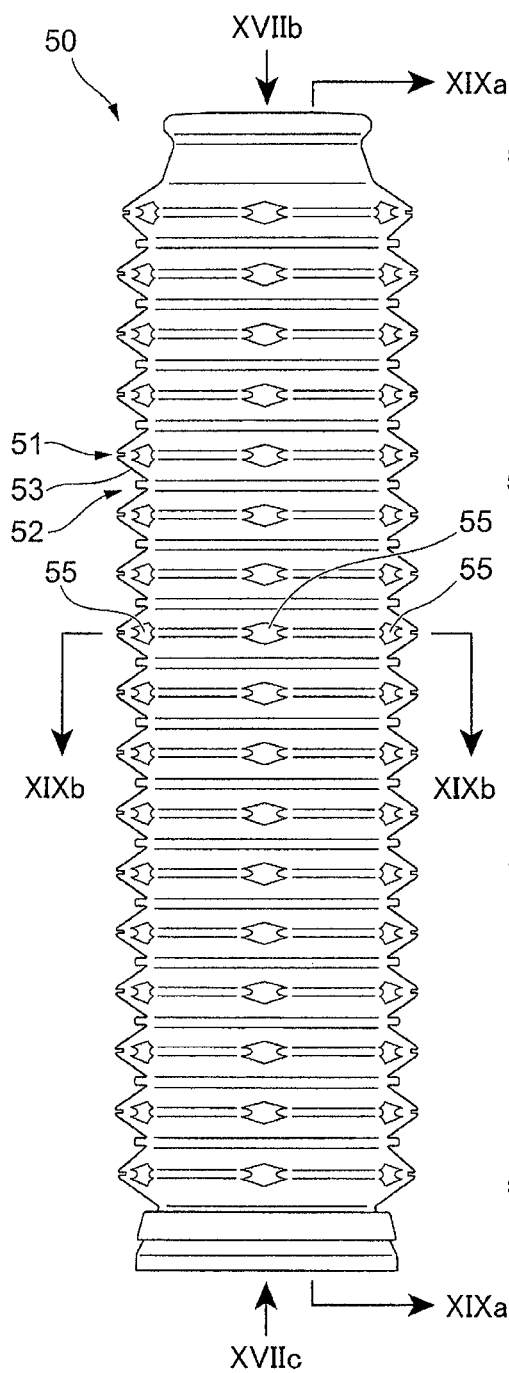
FIGS. 17A to 17C are views illustrating the dust cover of Modification Example 9.
Figure 17B:
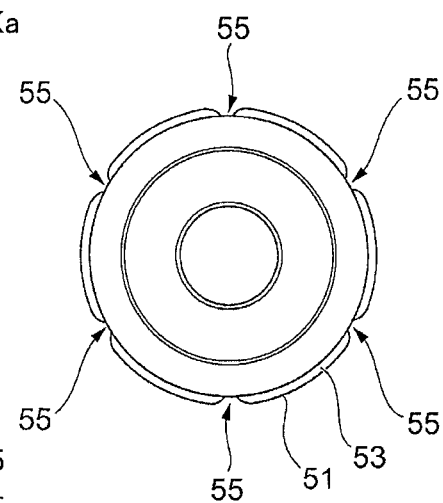
Figure 17C:
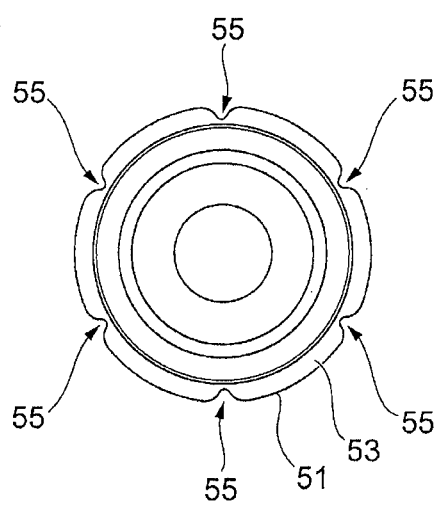

FIGS. 17A to 17C are views illustrating the dust cover 50 of Modification Example 9. FIG. 17A is a front view of the dust cover 50 of Modification Example 9, FIG. 17B is a plan view taken along arrows XVIIb illustrated in FIG. 17A, and FIG. 17C is a bottom view taken along arrows XVIIc illustrated in FIG. 17A. A rear view of the dust cover 50 of Modification Example 9 is the same as the front view illustrated in FIG. 17A.

Figure 18:
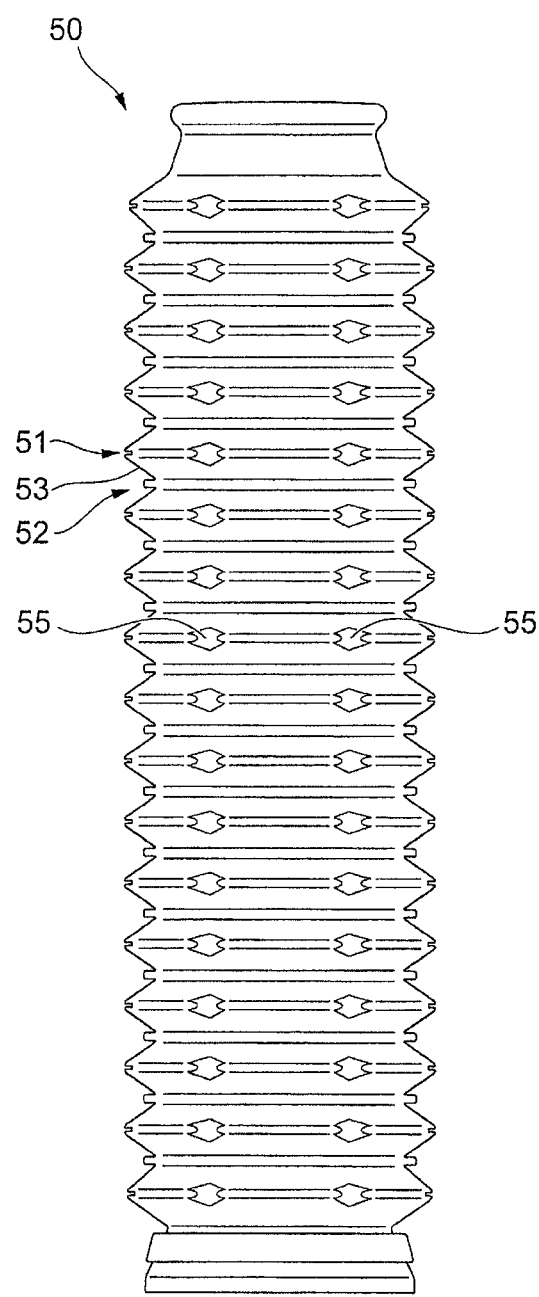
FIG. 18 is a side view of the dust cover of Modification Example 9.

FIG. 18 is a side view of the dust cover 50 of Modification Example 9. A right side view of the dust cover 50 of Modification Example 9 is the same as a left side view.

Figure 19A:
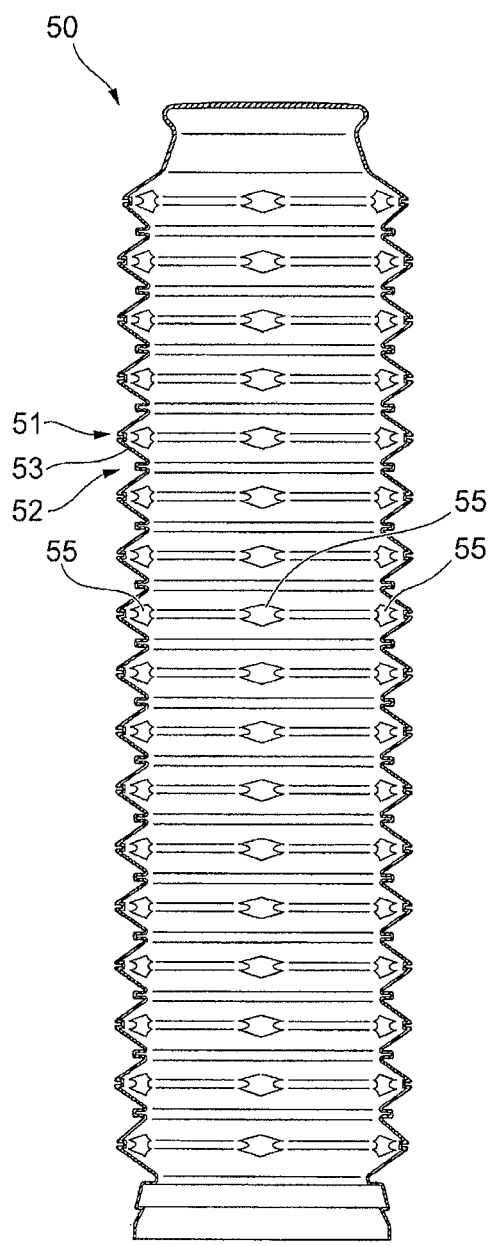
FIGS. 19A and 19B are cross-sectional views of the dust cover of Modification Example 9.
Figure 19B:
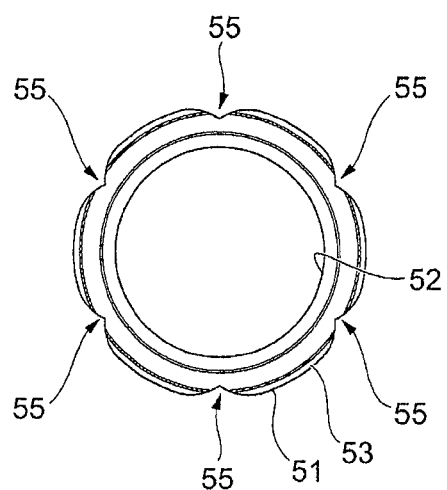

FIGS. 19A and 19B are cross-sectional views of the dust cover 50 of Modification Example 9. FIG. 19A is an axial cross-sectional view of the dust cover 50 of Modification Example 9 taken along cross section line XIXa-XIXa illustrated in FIG. 17A, and FIG. 19B is a radial cross-sectional view of the dust cover 50 of Modification Example 9 taken along cross section line XIXb-XIXb illustrated in FIG. 17A.

In the dust cover 50, as illustrated in FIGS. 17A to 17C, FIG. 18, and FIGS. 19A and 19B, the axial length or the like of each of the peak section 51 and the valley section 52 (so-called bellow-like section) is not limited to a specific length. For example, as illustrated in FIGS. 17A to 17C, the other modification examples can be applied to the dust cover 50 of Modification Example 9 having a long axial length.
Regarding Application of Dust Cover to Embodiment 2 and Embodiment 3

In Embodiment 1 and Modification Examples 1 to 9 of Embodiment 1, the following has been described based on the basic configuration of the dust cover 50 (the dust cover 50 in which the peak-section radial concave section 70 and the valley-section radial concave section 80 are respectively formed in the peak section 51 and the valley section 52) of Embodiment 1: position of the formation of the axial concave section 55; formation of the axial concave sections 55 and the axial convex sections 56 in the entirety of the dust cover 50; shape of each of the axial concave section 55 and the axial convex section 56; and modification examples of the position of the formation of the axial concave section 55 and the axial convex section 56. Modification Examples 1 to 9 can be applied to the dust cover 250 (the dust cover in which the peak-section radial concave section 70 and the valley-section radial concave section 80 are not respectively provided in the peak section 51 and the valley section 52) of Embodiment 2, and the dust cover 350 (the dust cover in which the peak-section radial concave section 70 is provided in only the peak section 51) of Embodiment 3.

In summary, the axial concave section 55 may be provided in only the peak section 51, the axial concave section 55 (or the axial convex section 56) may be provided in either the valley section 52 or the connection section 53, or the axial concave sections 55 (or the axial convex sections 56) may be respectively provided in two of the peak section 51, the valley section 52, and the connection section 53. The axial-concave sections 55 (or the axial convex sections 56) may be respectively provided in three sections including the peak section 51, the valley section 52, and the connection section 53. The shape, the size, the position of the axial concave section 55 (or the axial convex section 56) are not limited to those in the dust cover 250 of Embodiment 2 or those in the dust cover 350 of Embodiment 3, and may be changed.

Modification Examples 1 to 9 can be also applied to the dust cover in which the axial concave section 55 or the axial convex section 56 is provided in the valley section 52 (252 or 352), which is not illustrated.

In the bellows-like dust cover 50 of each of the embodiments in which the peak sections 51 and the valley sections 52 are successively formed, the peak-section radial concave section 70 is formed in the peak section 51, the valley-section radial concave section 80 is formed in the valley section 52, and the axial concave sections 55 and the like are formed in the axial direction; however, particularly, the application of the present invention is not limited to the dust cover 50 of the suspension apparatus 100. The application of the present invention is not limited to the dust cover 50 of the suspension apparatus 100, and for example, the dust cover 50 of the present invention can be applied to a location in which dust intrusion is required to be prevented in an automobile (two-wheeled, four wheeled vehicle, and the like), a bicycle, a construction machine, a hydraulic machine, and the like. The application of the present invention is not limited to the suspension apparatus in which the spring 30 is disposed on an outer circumference of the dust cover 50 as illustrated in FIGS. 1 and 2, and the present invention may be applied to a suspension apparatus in which the spring 30 is disposed in parallel with the damper device, and the spring 30 is not disposed on the outer circumference of the dust cover 50.

Embodiment 4

Figure 20:
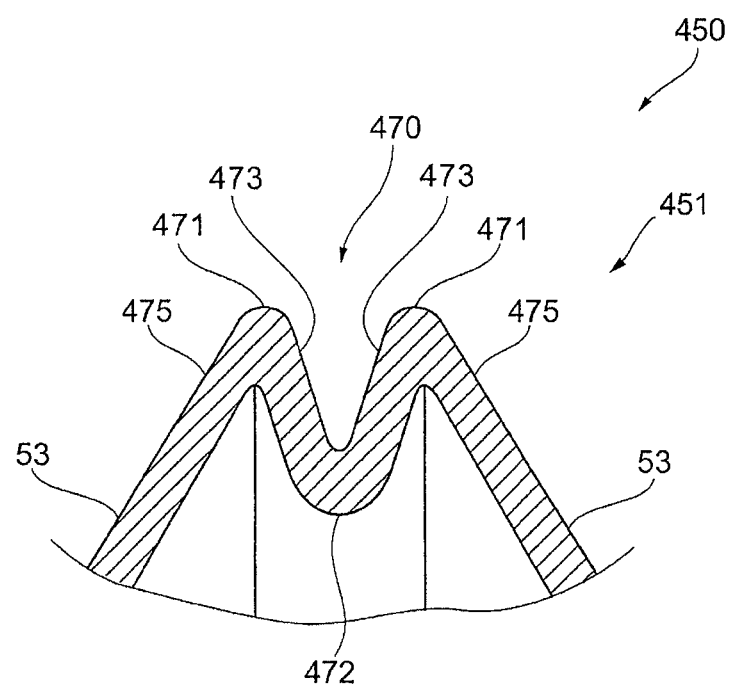
FIG. 20 is a view illustrating a dust cover of Embodiment 4.

FIG. 20 is a view illustrating a dust cover 450 of Embodiment 4. FIG. 20 is a cross-sectional view illustrating a partial axial section of the dust cover 450. In the cross-sectional view of the dust cover 50 of Embodiment 1 taken along the center axis 50a, the peak section 51 (more specifically, the peak-section radial concave section 70) has a U shape; however, the shape is not limited to a U shape.

For example, as illustrated in the dust cover 450 of Embodiment 4 (in the same cross-sectional view as in Embodiment 1), a peak section 451 of the dust cover 450 may be substantially V shaped.

Hereinafter, the shape of the peak section 451 will be described in detail.

As illustrated in FIG. 20, in the dust cover 450 of Embodiment 4, the peak section 451 has a peak-section radial concave section 470, and a junction section 475 through which the peak-section radial concave section 470 is joined to the connection section 53.

The peak-section radial concave section 470 has two edge sections 471 configured to radially protrude outward from the connection section 53; a bottom section 472 which is positioned between both of the edge sections 471 and is formed on an inside further from the edge sections 471 in the radial direction; and a side section 473 through which the edge section 471 is joined to the bottom section 472. The junction section 475 is a section through which the edge section 471 of the peak-section radial concave section 470 is joined to the connection section 53.

In summary, in the cross-sectional view taken along the center axis 50a, the peak-section radial concave section 470 is substantially V shaped.

When the suspension apparatus 100 is compressed, two facing side sections 473 (joined to the bottom section 472) move toward each other, and approach each other with the bottom section 472 positioned at a center. That is, in the dust cover 450, it is possible to considerably eliminate a useless space between the two side sections 473, and to reduce the entire axial length of the dust cover 450.

In the dust cover 450 of Embodiment 4 having the aforementioned configuration, (similar to the dust cover 50 of Embodiment 1), it is possible to prevent the occurrence of contact noise in all of the connection sections 53, and to reduce rapid axial reverse motions of the connection sections 53. However, in the dust cover 450, since the peak-section radial concave section 470 is a substantially V-shaped cross section when viewed along a plane in parallel with the center axis 50a, and the dust cover 450 has a reduced axial length when compressed, it is possible to absorb a shape deformation associated with reverse motions of the connection sections 53, and to prevent the occurrence of contact noise in the connection sections 53.

The peak section 451 of the dust cover 450 of Embodiment 4 can be applied to the other embodiments (for example, the dust cover 350 of Embodiment 3).

Embodiment 5

A dust cover 550 of Embodiment 5 is different from those in the other embodiments in that the dust cover 550 has two valley sections having different radial lengths. Hereinafter, the points of difference will be mainly described.

Figure 21:
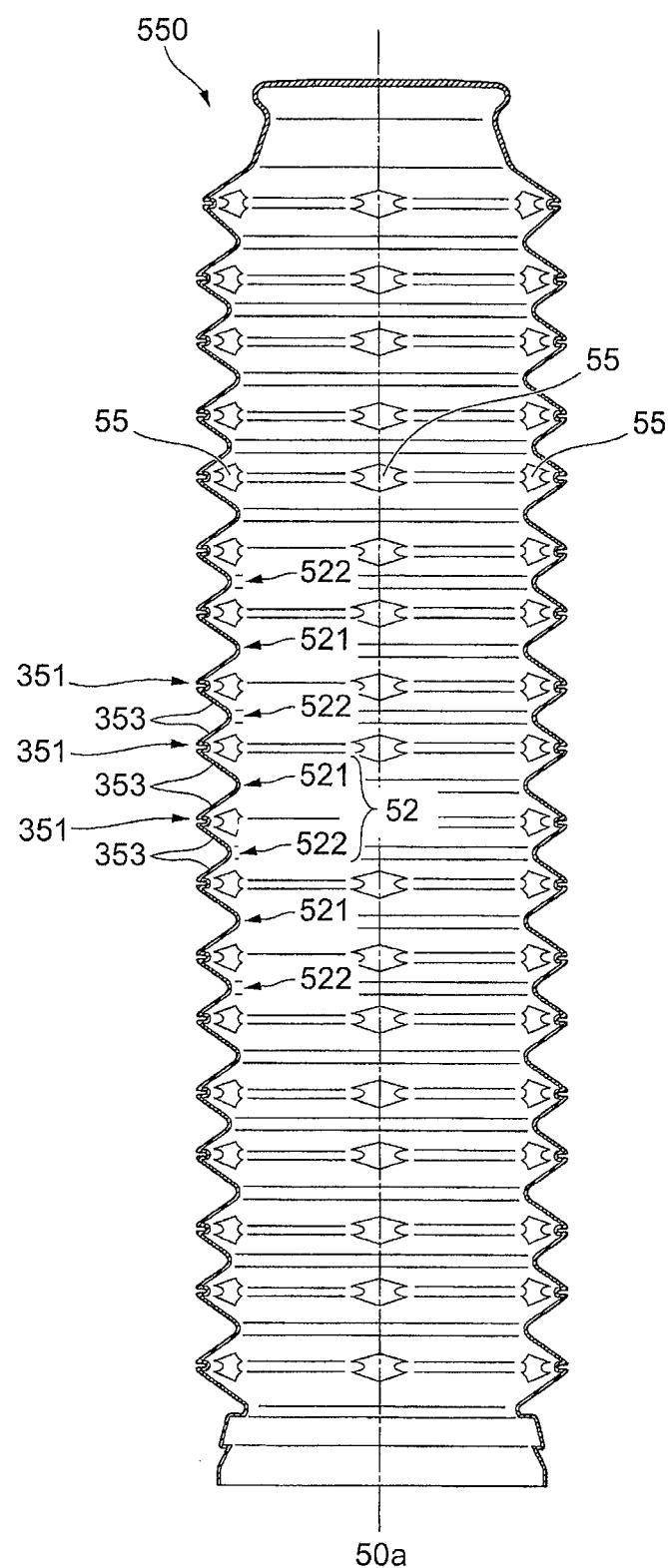
FIG. 21 is an axial cross-sectional view of the entirety of a dust cover of Embodiment 5.

FIG. 21 is an axial cross-sectional view of the entirety of the dust cover 550 of Embodiment 5.

Figure 22:
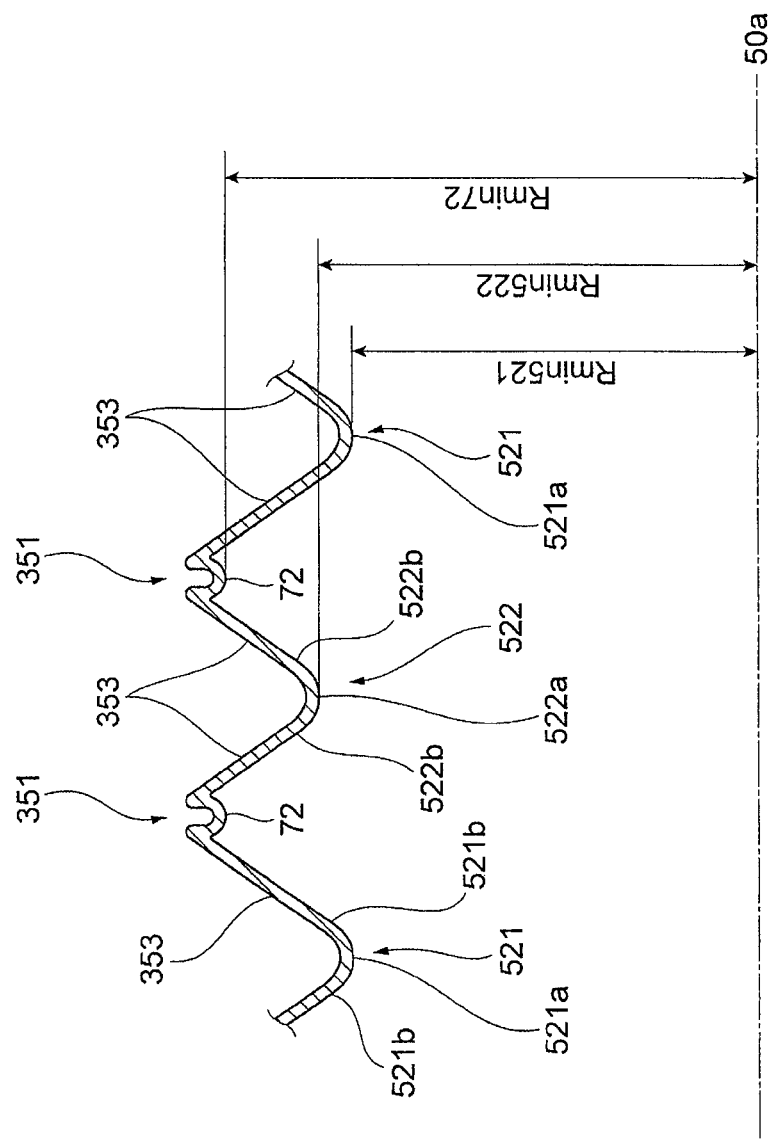
FIG. 22 is an enlarged axial cross-sectional view of the dust cover of Embodiment 5.

FIG. 22 is an enlarged axial cross-sectional view of the dust cover 550 of Embodiment 5.

Figure 23:
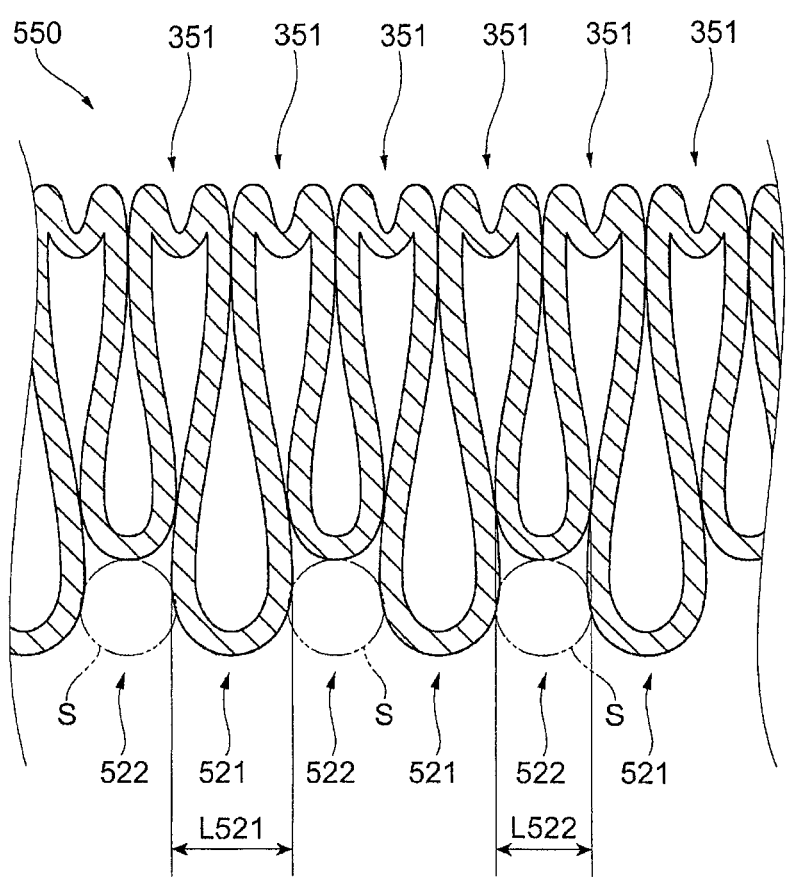
FIG. 23 is a view illustrating a maximum compression state of the dust cover of Embodiment 5.

FIG. 23 is a view illustrating a maximum compression state of the dust cover 550 of Embodiment 5.

As illustrated in FIGS. 21 and 22, in the dust cover 550 of Embodiment 5, valley sections 520 includes first valley sections 521, and second valley sections 522 each configured to protrude further outward than the first valley section 521 in the radial direction.

More specifically, the first valley section 521 has a bottom section 521a, and a junction section 521b through which the bottom section 521a is joined to a connection section 353. The second valley section 522 has a bottom section 522a, and a junction section 522b through which the bottom section 522a is joined to the connection section 353.

The second valley section 522 (the bottom section 522a of the second valley section 522) protrudes further outward than the first valley section 521 (the bottom section 521a of the first valley section 521) in the radial direction. More specifically, a length Rmin522 from the center axis 50a to the tip of the bottom section 522a of the second valley section 522 is greater than a length Rmin521 from the center axis 50a to the tip of the bottom section 521a of the first valley section 521.

The first valley sections 521 and the second valley sections 522 are alternately disposed in the direction of the center axis 50a. That is, the dust cover 550 of Embodiment 5 has pairs of sections repeatedly formed in the direction of the center axis 50a. Pairs of sections is made of the first valley section 521, the connection section 353, a peak section 351, the connection section 353, the second valley section 522, the connection section 353, the peak section 351, and the connection section 353, all of which are sequentially formed in the direction of the center axis 50a.

As illustrated in FIG. 23, since the second valley section 522 has a long radial length, the dust cover 550 can have a space S formed on a radial inside of the second valley section 522 (between the first valley sections 521). A partial swelling of the first valley section 521 in the axial direction moves into a space S on the radial inside of the second valley section 522. In summary, the second valley sections 522 (more specifically, the space S on the radial inside of the second valley section 522) can absorb the first valley sections 521 in the axial direction.

An axial length L522 of the second valley section 522 is less than an axial length L521 of the first valley section 521.

In Embodiment 5, it is possible to reduce the entire axial length of the dust cover 550 (when the dust cover 550 of Embodiment 5 is compressed in the axial direction) due to a combination of a short axial length L522 of the second valley section 522, and the absorption of the axial length of the first valley section 521 by the second valley section 522.

The dust cover 550 having the valley sections (the first valley section 521 and the second valley section 522) of different radial lengths which are associated with a reduction in the axial length of the dust cover 550 (when the dust cover 550 of Embodiment 5 is compressed in the axial direction), has an axial length which is shorter than that of the dust cover having the valley sections of the same radial length.

In the dust cover 550 of Embodiment 5 having the aforementioned configuration, (similar to the dust cover 50 of Embodiment 1), it is possible to prevent the occurrence of contact noise in all of the connection sections 353, and to reduce rapid axial reverse motions of the connection sections 353. Since the dust cover 550 includes the valley sections (the first valley section and the second valley section) having different radial lengths, and is configured to have a reduced axial length when compressed, it is possible to absorb a shape deformation associated with reverse motions of the connection sections 353, and to prevent the occurrence of contact noise in the connection sections 353.

The configuration of the dust cover 550 (more specifically, the configuration in which the dust cover 550 is provided with the valley sections 520 having two different radial lengths from the center axis 50a) of Embodiment 5 may be applied to the other embodiments (for example, the dust cover 50 of Embodiment 1).

The application of different radial lengths is not limited to the valley section, and the peak sections may have different radial lengths. A first valley section and a second valley section having different radial lengths may be provided, and a first peak section and a second peak section having different radial lengths may be provided in both the valley section and the peak section.

In regard to the radial length of the valley section, the valley sections having three or more different radial lengths may be provided. Similarly, in regard to the radial length of the peak section, the peak sections having three or more different radial lengths may be provided.

In Embodiment 5, the first valley section and the second valley section having different radial lengths are alternately formed in the axial direction; however, the first valley section and the second valley section are not necessarily alternately formed.

Embodiment 6

A dust cover 650 of Embodiment 6 is different from those in the other embodiments in that the dust cover 650 adopts a configuration in which the thickness thereof is gradually reduced from the inside (the side of the center axis 50a) toward the outside (outer circumference) in the radial direction.

Figure 24A:
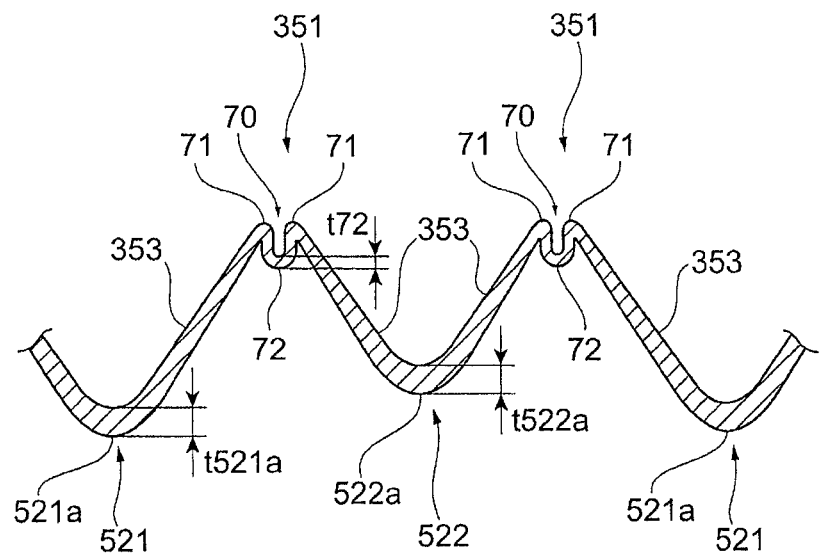
FIG. 24A is an enlarged axial cross-sectional view of a dust cover which is obtained by reducing the thickness of the dust cover of Embodiment 5 illustrated in FIGS. 21 and 22 from the inside toward the outside in the radial direction.
Figure 24B:
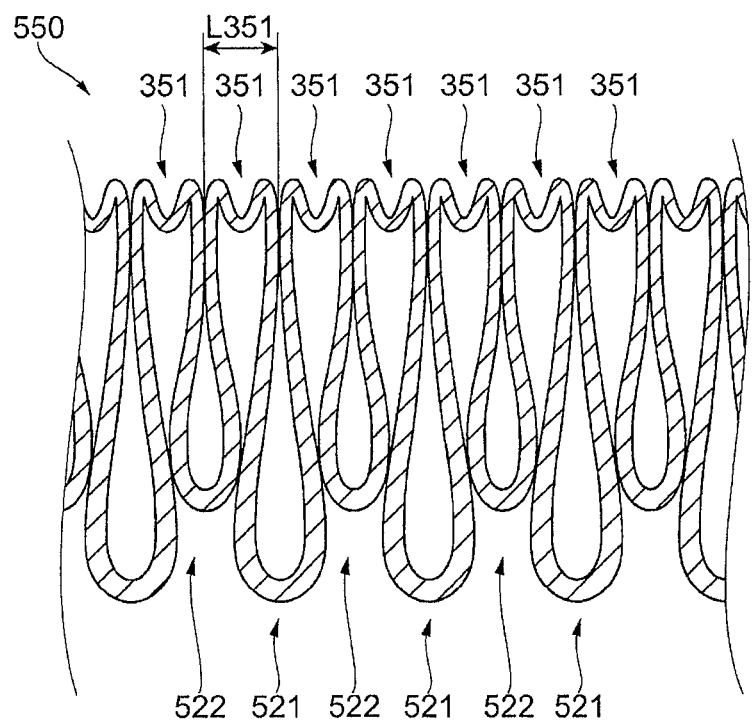
FIG. 24B is a view illustrating a maximum compression state of the dust cover of Embodiment 6.

FIG. 24A is an enlarged axial cross-sectional view of the dust cover 650 which is obtained by reducing the thickness of the dust cover 550 of Embodiment 5 illustrated in FIGS. 21 and 22 from the inside toward the outside in the radial direction. FIG. 24B is a view illustrating a maximum compression state of the dust cover 650 of Embodiment 6.

As illustrated in FIGS. 24A and 24B, the dust cover 650 of Embodiment 6 is molded such that the thickness thereof is gradually reduced from the inside (the side of the center axis 50a) toward the outside (outer circumference) in the radial direction. More specifically, a thickness t72 of the bottom section 72 of the peak-section radial concave section 70 of the peak section 351 is molded to be thinner than a thickness t521a of the bottom section 521a of the first valley section 521 or a thickness t522a of the bottom section 522a of the second valley section 522.

As illustrated in FIG. 24B, when the dust cover 650 is compressed to as much as possible, an axial length L351 of the dust cover 650 (having a thin section on the radial outside) becomes short compared to the axial length when the dust cover 650 has the same thickness.

In the dust cover 650 with the aforementioned configuration of Embodiment 6, (similar to the dust cover 50 of Embodiment 1), it is possible to prevent the occurrence of contact noise in all of the connection sections 353, and to reduce rapid axial reverse motions of the connection sections 353. Since the dust cover 650 is configured such that the thickness thereof is gradually reduced from the inside (the side of the center axis 50a) toward the outside (outer circumference) in the radial direction, and the dust cover 650 has a reduced axial length when compressed, it is possible to absorb a shape deformation associated with reverse motions of the connection sections 353, and to prevent the occurrence of contact noise in the connection sections 353.

The configuration of the dust cover 650 of Embodiment 6, in which the thickness thereof is gradually reduced from the inside toward the outside in the radial direction, may be applied to the respective dust covers 50, 250, 350, 450, and 550 of Embodiments 1 to 5.

What is claimed is:

1. A cover member that is formed in a cylindrical shape in an axial direction of a suspension apparatus configured to dampen a shock, and that is extendable and compressible in the axial direction, the member comprising:
   a plurality of peak sections provided in the axial direction and configured to protrude outward in a radial direction, each of said peak sections having an outer peripheral surface;
   a plurality of valley sections provided in the axial direction and configured to protrude inward in the radial direction, each of said valley sections having an inner peripheral surface; and
   a plurality of connection sections provided in the axial direction and configured to connect the peak sections and the valley sections, wherein
   at least one axial concave section formed in the axial direction is provided in the peak section and has a connection portion that extends to the connection section,
   a peak radial concave section is formed in each of the peak sections, said peak radial concave section being concave inward in a radial direction,
   a valley radial concave section is formed in each of the valley sections, said valley radial concave section being concave outward in a radial direction,
   the at least one axial concave section is a cutaway having a radially inner portion, said cutaway being concave radially inward from the outer peripheral surface of the peak section,
   a first radial distance between the outer peripheral surface of the peak section and the radially inner portion is shorter than a second radial distance between the radially inner portion and the inner peripheral surface of the valley section, and
   the second radial distance is shorter than any portion of a third radial distance between the inner peripheral surface of the valley section and the outer peripheral surface of the peak section where no axial concave section is formed.

2. The cover member according to claim 1, wherein the cover member comprises a plurality of axial concave sections; and
   the axial concave sections are respectively formed in the plurality of peak sections at the same circumferential position in such a manner so as to be linearly disposed in the axial direction.

3. The cover member according to claim 1, wherein one of the peak sections has a plurality of axial concave sections, and
   a circumferential length of the peak section between one of the axial concave sections and a first one of the axial concave sections adjacent to the one of axial concave sections is the same as that between the one of the axial concave sections and a second one of the axial concave sections adjacent the one of axial concave sections.

4. A suspension apparatus comprising:
   a cylinder configured to accommodate liquid therein;
   a piston accommodated in the cylinder and configured to dampen input vibration;
   a piston rod having the piston on a first tip thereof; and
   a cover member which is an axially extending cylindrical member, in which a peak section group having a plurality of peak sections configured to protrude outward in a radial direction, each of said peak sections having an outer peripheral surface, a valley section group having a plurality of valley sections configured to protrude inward in the radial direction, each of said valley sections having an inner peripheral surface; and a connection section group having a plurality of connection sections configured to connect the peak sections and the valley sections are disposed in an axial direction,
   wherein the cover member is extended and compressed in a direction in which the peak sections and the valley sections are disposed side by side, or is bent,
   the cover member has axial concave sections formed in the axial direction provided in the peak section group,
   the axial concave sections of the peak sections are respectively formed at the same circumferential position in such a manner so as to be linearly disposed in the axial direction,
   each of the axial concave sections has a connection portion that extends to reach the connection section,
   a peak radial concave section is formed in the peak section, said peak radial concave section being concave inward in a radial direction,
   a valley radial concave section is formed in each of the valley sections, said valley radial concave section being concave outward in a radial direction,
   the at least one axial concave section is a cutaway having a radially inner portion, said cutaway being concave radially inward from the outer peripheral surface of the peak section,
   a first radial distance between the outer peripheral surface of the peak section and the radially inner portion is shorter than a second radial distance between the radially inner portion and the inner peripheral surface of the valley section, and
   the second radial distance is shorter than any portion of a third radial distance between the inner peripheral surface of the valley section and the outer peripheral surface of the peak section where no axial concave section is formed.

5. The cover member according to claim 1, wherein the first radial distance is greater than a depth of the peak radial concave section.

6. The cover member according to claim 1, wherein each of the peak sections has a first arcuate portion and a second arcuate portion, both of which extend in a circumferential direction and are defined by a common radius, and
   the axial concave section is formed between the first and second arcuate portions.

7. The cover member according to claim 1, wherein the cover member comprises a plurality of axial concave sections; and
   the cover member consists of four axial concave sections in a circumferential direction thereof.

8. The cover member according to claim 1,
wherein the first radial distance is formed sufficiently large so as to absorb radial shape deformations of the connection sections associated with axial reverse motions of the connection sections.

9. A cover member that is formed in a cylindrical shape in an axial direction of a suspension apparatus configured to dampen a shock, and that is extendable and compressible in the axial direction, the member comprising:
a plurality of peak sections provided in the axial direction and configured to protrude outward in a radial direction, each of said peak sections having an outer peripheral surface;
a plurality of valley sections provided in the axial direction and configured to protrude inward in the radial direction, each of said valley sections having an inner peripheral surface; and
a plurality of connection sections provided in the axial direction and configured to connect the peak sections and the valley sections,
wherein at least one axial concave section formed in the axial direction is provided in the peak section and has a connection portion that extends to the connection section,
a peak radial concave section is formed in each of the peak sections, said peak radial concave section being concave inward in a radial direction,
a valley radial concave section is formed in each of the valley sections, said valley radial concave section being concave outward in a radial direction,
an inner diameter of the cover member is constant;
the at least one axial concave section is a cutaway having a radially inner portion, said cutaway being concave radially inward from the outer peripheral surface of the peak section,
a first radial distance between the outer peripheral surface of the peak section and the radially inner portion is shorter than a second radial distance between the radially inner portion and the inner peripheral surface of the valley section, and
the second radial distance is shorter than any portion of a third radial distance between the inner peripheral surface of the valley section and the outer peripheral surface of the peak section where no axial concave section is formed.

10. The cover member according to claim 7, wherein the third radial distance is constant in a portion of the cover member where no axial concave section is formed.

11. The cover member according to claim 1, wherein the peak radial concave section is provided only in a portion of the peak section where the axial concave section is not formed.

12. The cover member according to claim 1, wherein the cutaway is a portion of the cover member where a part of the peak section is removed.

13. The cover member according to claim 1, wherein the radially inner portion of the cutaway has a surface extending in the axial direction.

14. The cover member according to claim 13, wherein the surface of the radially inner portion extends in a direction parallel to the axial direction.

15. The cover member according to claim 1, wherein
the peak radial concave section concaves inwardly from an apex, and
the apex is formed at a point where extensions of outer surfaces of adjacent two connection portions meet.

* * * * *